(12) United States Patent
Blum

(10) Patent No.: US 11,583,136 B1
(45) Date of Patent: Feb. 21, 2023

(54) GRIDDLE

(71) Applicant: Sub-Zero Group, Inc., Madison, WI (US)

(72) Inventor: Bronson Blum, Cottage Grove, WI (US)

(73) Assignee: Sub-Zero Group, Inc., Madison, WI (US)

( * ) Notice: Subject to any disclaimer, the term of this patent is extended or adjusted under 35 U.S.C. 154(b) by 235 days.

(21) Appl. No.: 17/164,905

(22) Filed: Feb. 2, 2021

(51) Int. Cl.
*A47J 37/10* (2006.01)
*A47J 37/06* (2006.01)

(52) U.S. Cl.
CPC .................. *A47J 37/067* (2013.01)

(58) Field of Classification Search
CPC .. A47J 37/067; A47J 37/0676; A47J 37/0682; A47J 37/0704; A47J 37/0713; A47J 37/0718; A47J 37/101
USPC ...... 99/422–425; 219/443.1, 452.11, 452.12, 219/465.1, 468.2
See application file for complete search history.

(56) References Cited

U.S. PATENT DOCUMENTS

| | | | | |
|---|---|---|---|---|
| 8,074,563 | B2 * | 12/2011 | Bowles | ................. A47J 37/067 99/422 |
| 11,499,723 | B2 * | 11/2022 | Cadima | .................. F24C 15/36 |
| 2008/0060634 | A1 | 3/2008 | Blum | |
| 2014/0096761 | A1 * | 4/2014 | Brantley | ............... A47J 37/067 126/39 M |
| 2019/0110641 | A1 * | 4/2019 | Lee | ......................... F24C 15/14 |
| 2020/0029732 | A1 * | 1/2020 | Kukuk | .................. A47J 27/002 |

* cited by examiner

*Primary Examiner* — Hung D Nguyen
(74) *Attorney, Agent, or Firm* — Bell & Manning, LLC

(57) ABSTRACT

A griddle includes a griddle plate, a heating element, a frame, and a plurality of nuts. The heating element provides heat to the griddle plate when the griddle is used. The frame includes a plurality of walls, a flange that extends from top edges of the plurality of walls, a plurality of studs mounted to extend upward from the flange, and a bottom wall that extends from bottom edges of the plurality of walls toward an interior of the plurality of walls. The heating element is mounted to the bottom wall. A nut of the plurality of nuts is mounted on each stud of the plurality of studs. A bottom surface of the griddle plate is mounted to abut each nut of the plurality of nuts to define an air gap around a perimeter of the griddle plate between the flange and the bottom surface of the griddle plate.

20 Claims, 29 Drawing Sheets

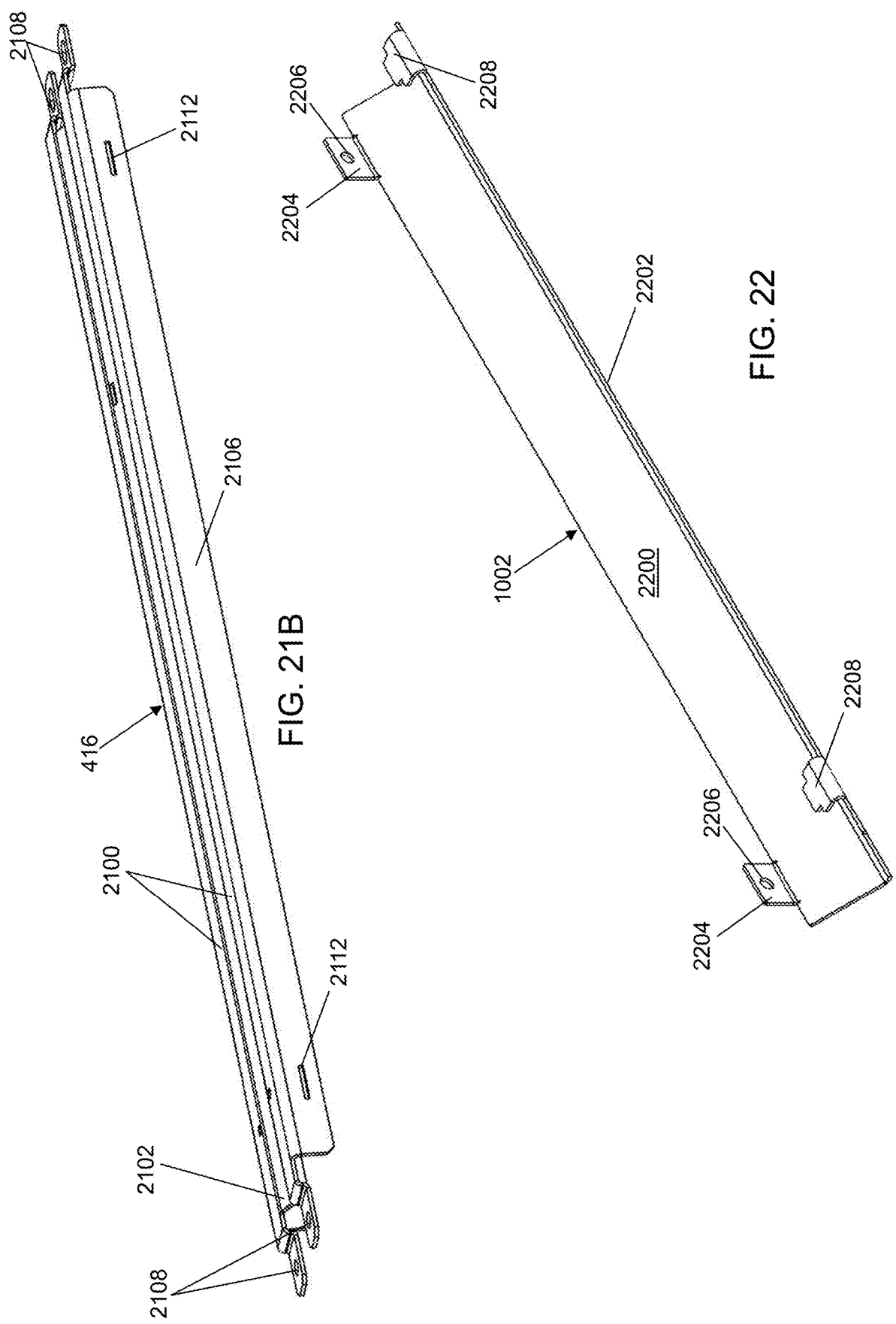

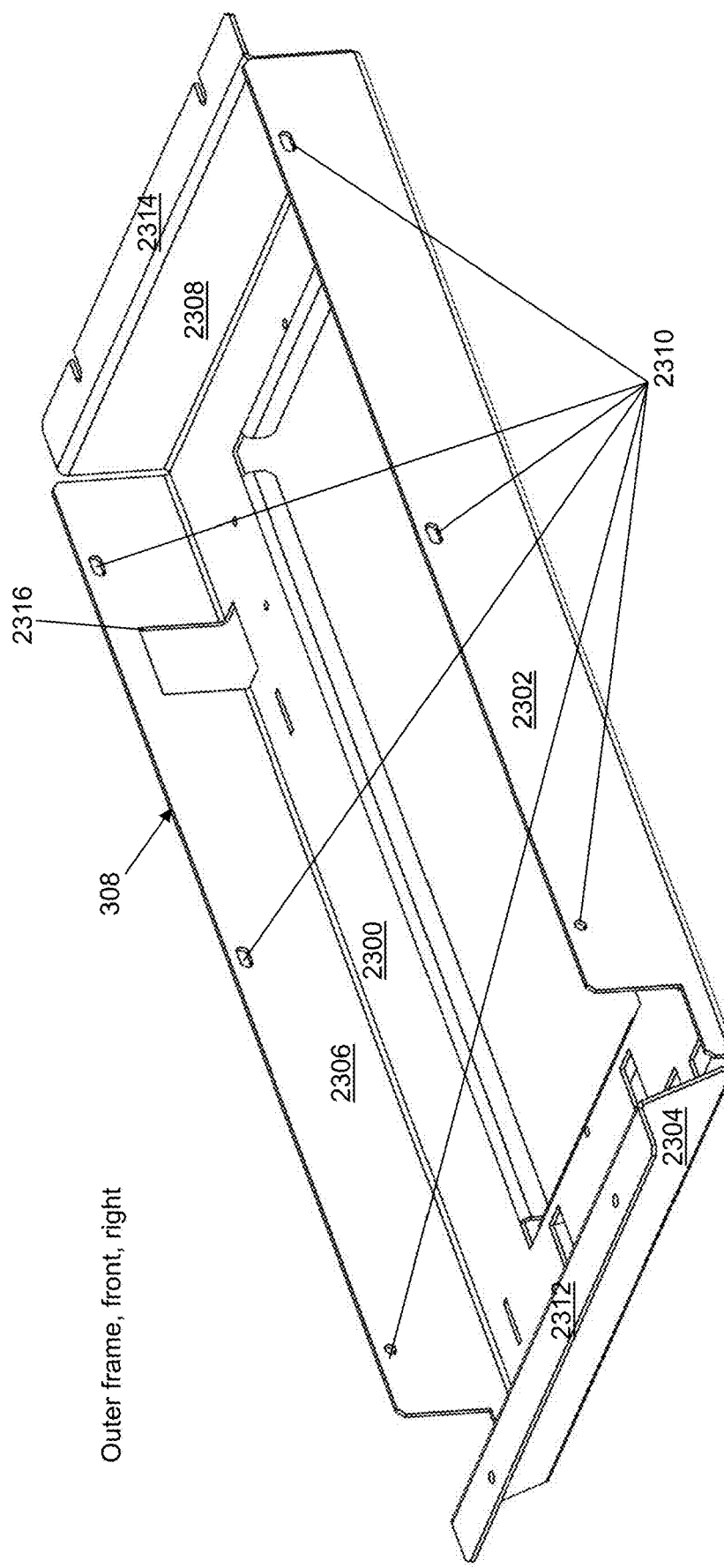

GRIDDLE

BACKGROUND

Existing griddles, whether stand-alone or integrated in a cooktop, have a vent along a single edge. The exhaust gas must travel to the single exhaust edge that is typically along a back edge of a griddle plate. The remaining sides are sealed possibly with insulation. The exhaust vent along a single edge results in an uneven heating of the griddle plate and reduces a cooking surface area.

SUMMARY

In an example embodiment, a griddle is provided. The griddle may include, but is not limited to, a griddle plate, a heating element, a frame, and a plurality of nuts. The heating element is configured to provide heat to the griddle plate when the griddle is used. The frame may include, but is not limited to, a plurality of walls, a flange that extends from top edges of the plurality of walls, a plurality of studs mounted to extend upward from the flange, and a bottom wall that extends from bottom edges of the plurality of walls toward an interior of the plurality of walls. The heating element is mounted to the bottom wall. A nut of the plurality of nuts is mounted on each stud of the plurality of studs. A bottom surface of the griddle plate is mounted to abut each nut of the plurality of nuts to define an air gap around a perimeter of the griddle plate between the flange and the bottom surface of the griddle plate.

In another example embodiment, a griddle is provided. The griddle may include, but is not limited to, a griddle plate, a heating element, an inner frame, an outer frame, and a plurality of nuts. The heating element is configured to provide heat to the griddle plate when the griddle is used. The inner frame may include, but is not limited to, a first plurality of walls, a flange that extends from top edges of the first plurality of walls, and a plurality of studs mounted to extend upward from the flange. The outer frame may include, but is not limited to, a second plurality of walls, and a bottom wall that extends from bottom edges of the second plurality of walls toward an interior of the second plurality of walls. The heating element is mounted to the bottom wall. A nut of the plurality of nuts is mounted on each stud of the plurality of studs. A bottom surface of the griddle plate is mounted to abut each nut of the plurality of nuts to define an air gap around a perimeter of the griddle plate between the flange and the bottom surface of the griddle plate.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 21B depicts a top, front, right perspective view of the thermostat bracket of FIG. 21A in accordance with an illustrative embodiment.

FIG. 22 depicts a top, front, right perspective view of a heat deflector of the griddle of FIG. 3 in accordance with an illustrative embodiment.

FIG. 23 depicts a top, front, left perspective view of the outer frame of the griddle of FIG. 3 in accordance with an illustrative embodiment.

DETAILED DESCRIPTION

Figure 1:
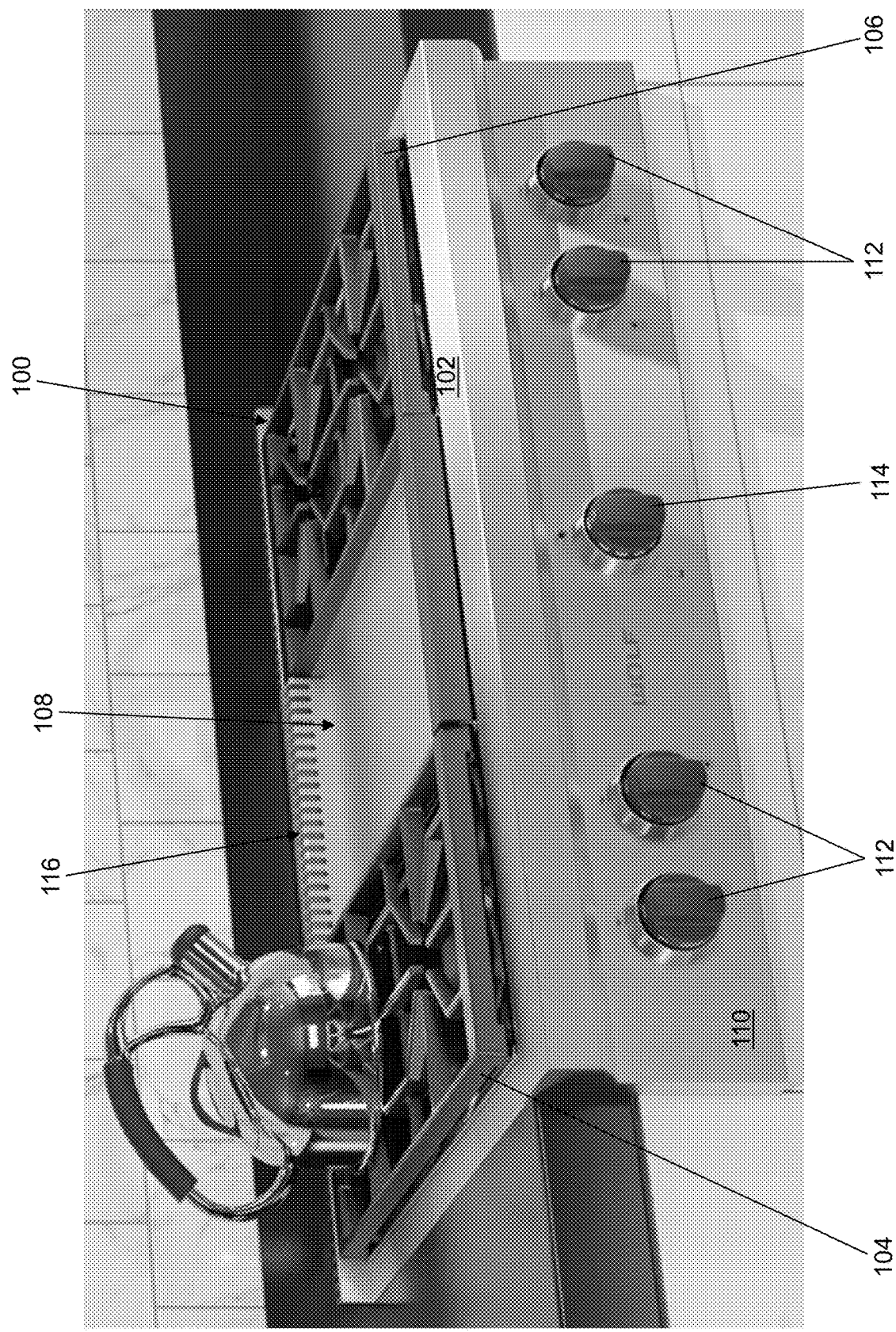
FIG. 1 depicts a top, front, left perspective view of a cooktop in accordance with an illustrative embodiment.

Referring to FIG. 1, a top, front, left perspective view of a cooktop 100 is shown in accordance with an illustrative embodiment. Cooktop 100 may include a top plate 102 and a front plate 110. In the illustrative embodiment of a gas cooktop, a first burner grate 104 and a second burner grate 106 are positioned over respective burners of a plurality of burners mounted through top plate 102. Burner control knobs 112 operate a height or one or more flames from each respective burner of the plurality of burners and are mounted through apertures in front plate 110.

In the illustrative embodiment, a prior art griddle 108 is mounted between first burner grate 104 and second burner grate 106 though prior art griddle 108 need not be integrated into cooktop 100. For example, prior art griddle 108 may be mounted in its own housing without the other elements of cooktop 100. When integrated into cooktop 100, prior art griddle 108 may be mounted in other locations and orientations and be larger or smaller than shown in the illustrative embodiment. A griddle control knob 114 controls a temperature of a griddle plate 200 (shown referring to FIG. 2) of prior art griddle 108 through operation of a griddle burner 201 (shown referring to FIG. 2) mounted below griddle plate 200. A vent 116 is located along a back edge of prior art griddle 108 to allow heated air to exhaust from below griddle plate 200.

Figure 2:
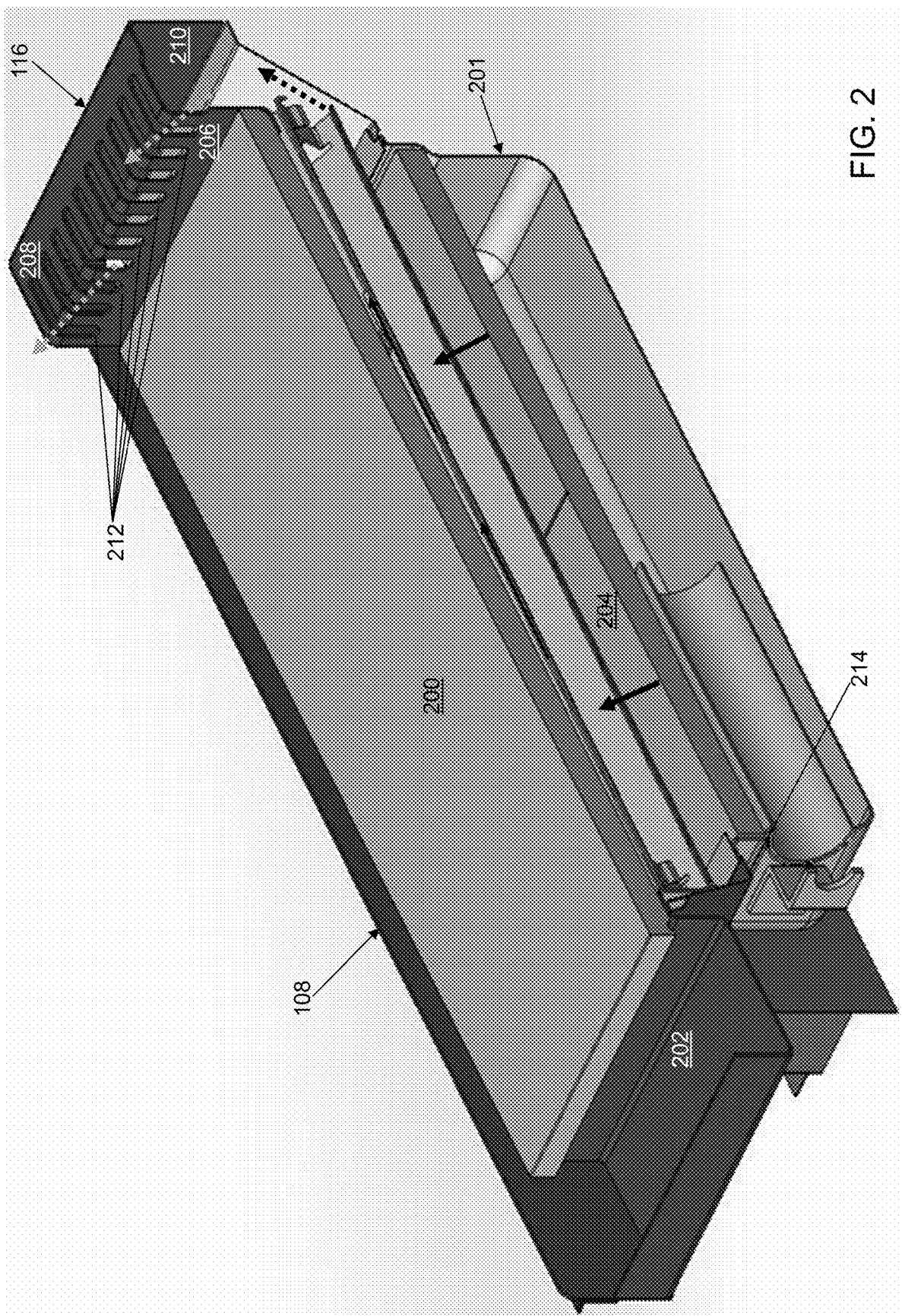
FIG. 2 depicts a top, front, right cross-sectional view of a prior art griddle of the cooktop of FIG. 1.

Referring to FIG. 2, a top, front, right cross-sectional view is shown of prior art griddle 108. Prior art griddle 108 may include griddle plate 200, vent 116, griddle burner 201, and a grease cup 202. In the illustrative embodiment, griddle burner 201 is an infrared burner that includes an infrared plate 204 positioned between a flame generated by a flow of gas and griddle plate 200. The thick solid arrows show a flow of hot air that radiates from infrared plate 204 toward a bottom surface of griddle plate 200. Grease cup 202 is mounted to a front of griddle plate 200 to catch grease or other debris when it flows off or is scraped off griddle plate 200.

Vent 116 includes a Π-shaped cavity formed by a front wall 206, a top wall 208, and a back wall 210. Aperture walls 212 are formed through a portion of front wall 206 and a portion of top wall 208 to exhaust heated air as shown by the dashed arrows. The heated air must travel to vent 116 to be exhausted from beneath griddle plate 200. The remaining three sides beneath griddle plate 200 are sealed with insulation between griddle plate 200 and a reflector pan 214.

Figure 3:
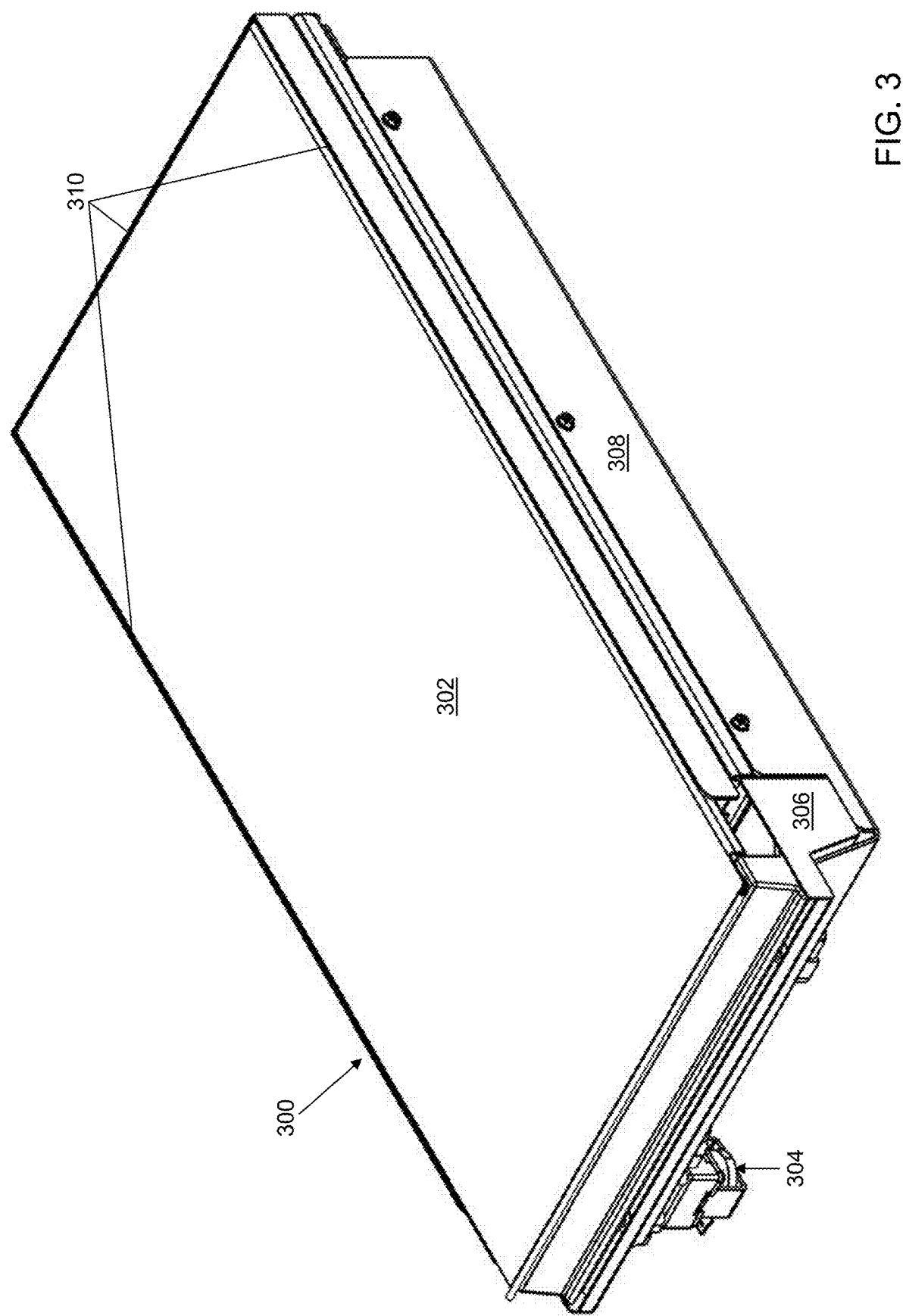
FIG. 3 depicts a top, front, right perspective view of a griddle in accordance with an illustrative embodiment.
Figure 4:
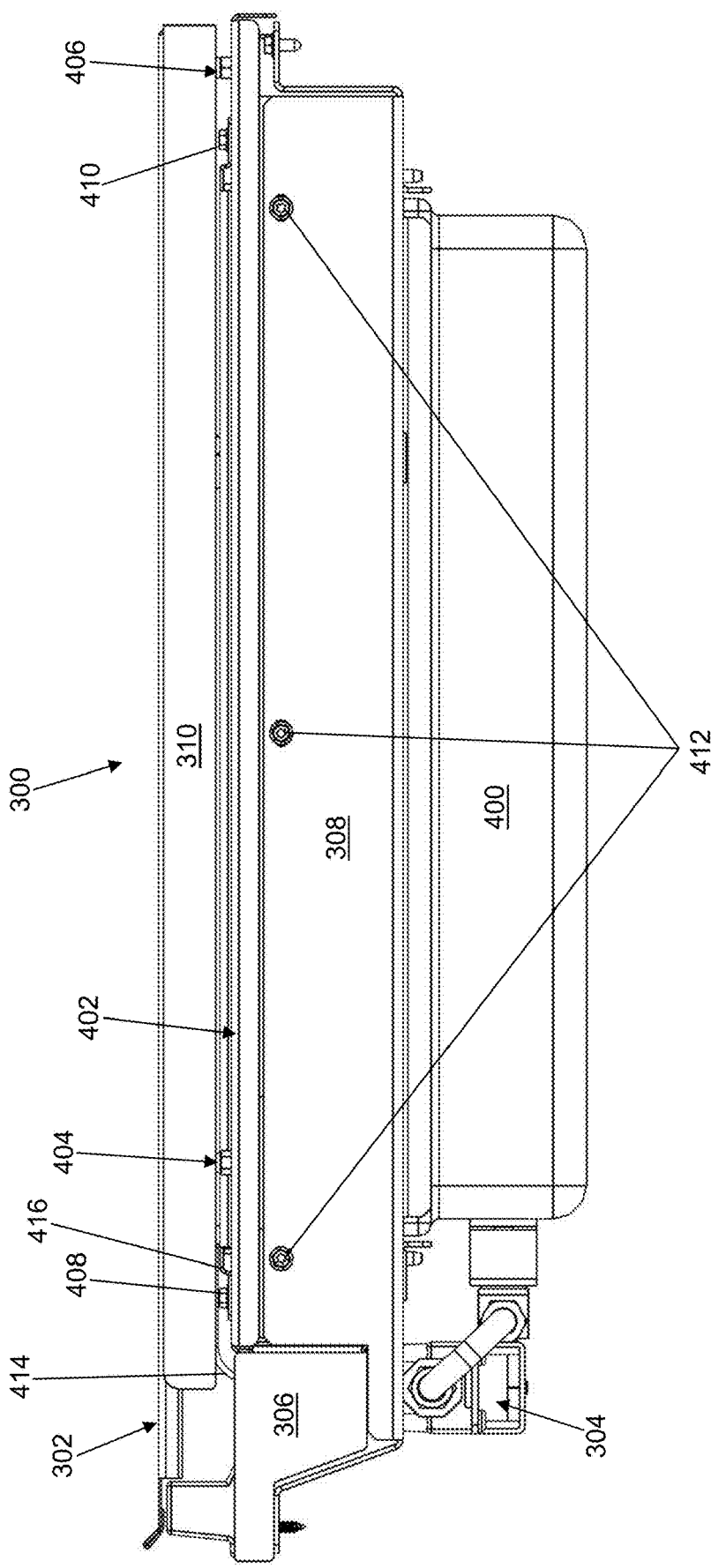
FIG. 4 depicts a right side view of the griddle of FIG. 3 in accordance with an illustrative embodiment.
Figure 5:
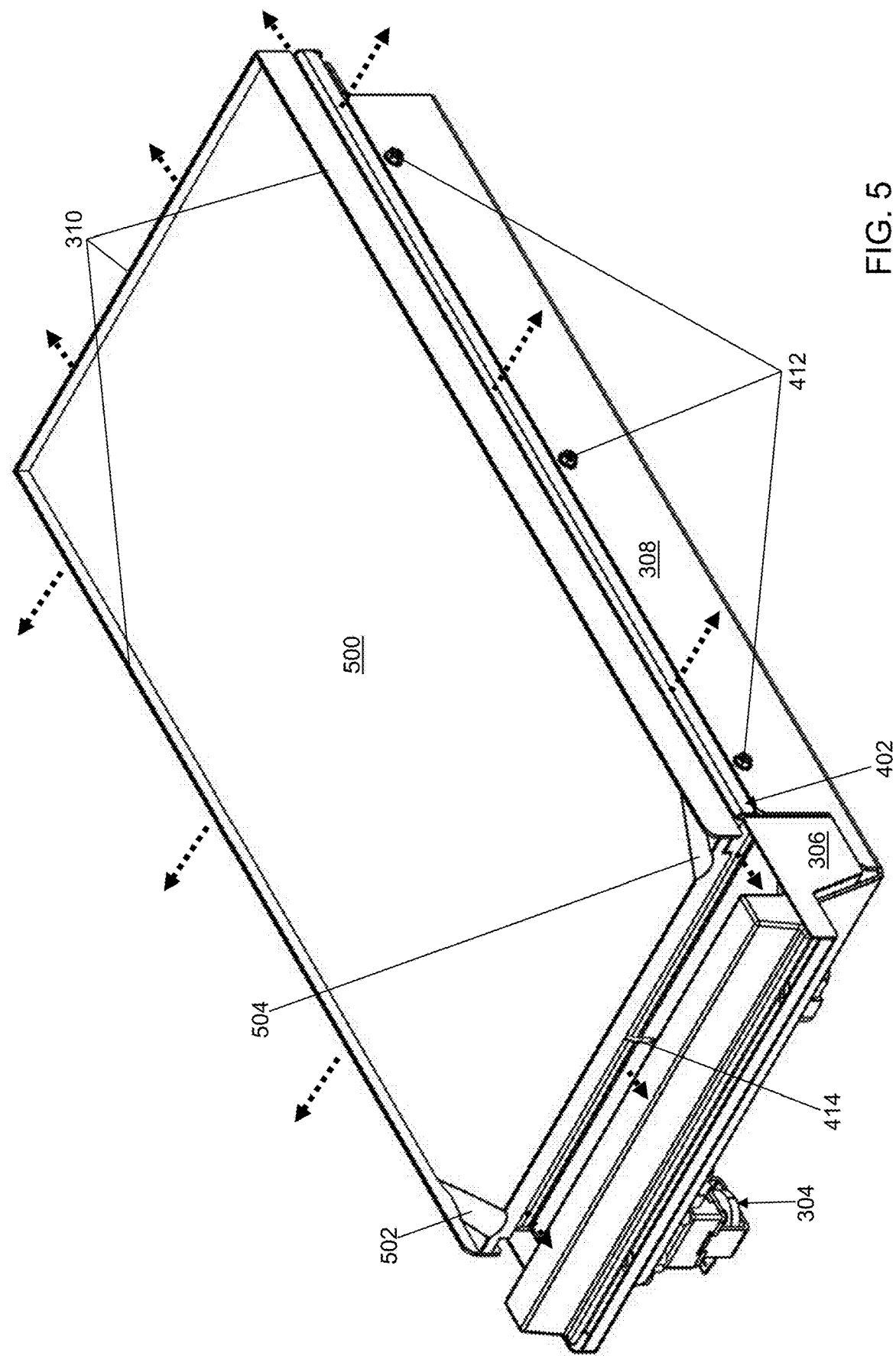
FIG. 5 depicts a top, front, right perspective view of the griddle of FIG. 3 with a cover removed in accordance with an illustrative embodiment.
Figure 6:
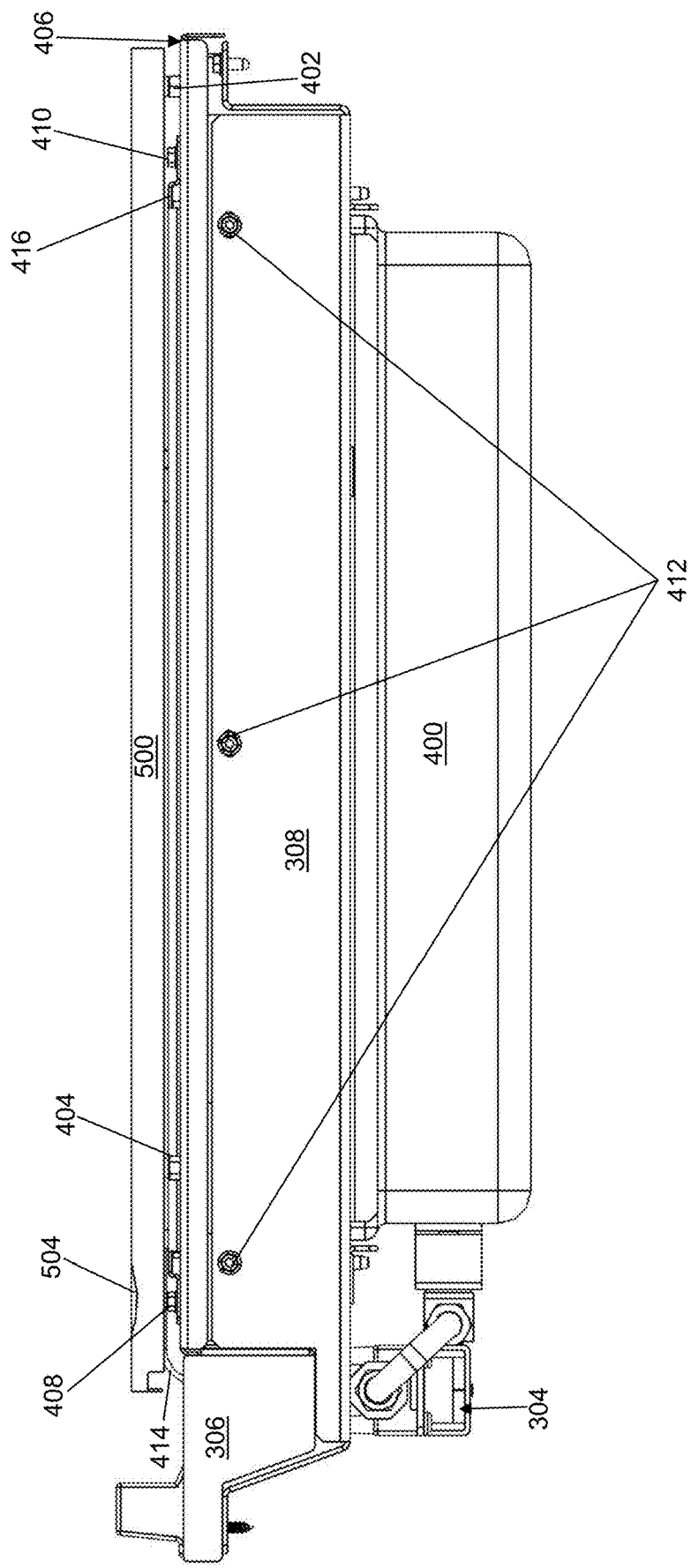
FIG. 6 depicts a right side view of the griddle of FIG. 3 with a cover and griddle plate sidewalls removed in accordance with an illustrative embodiment.
Figure 7:
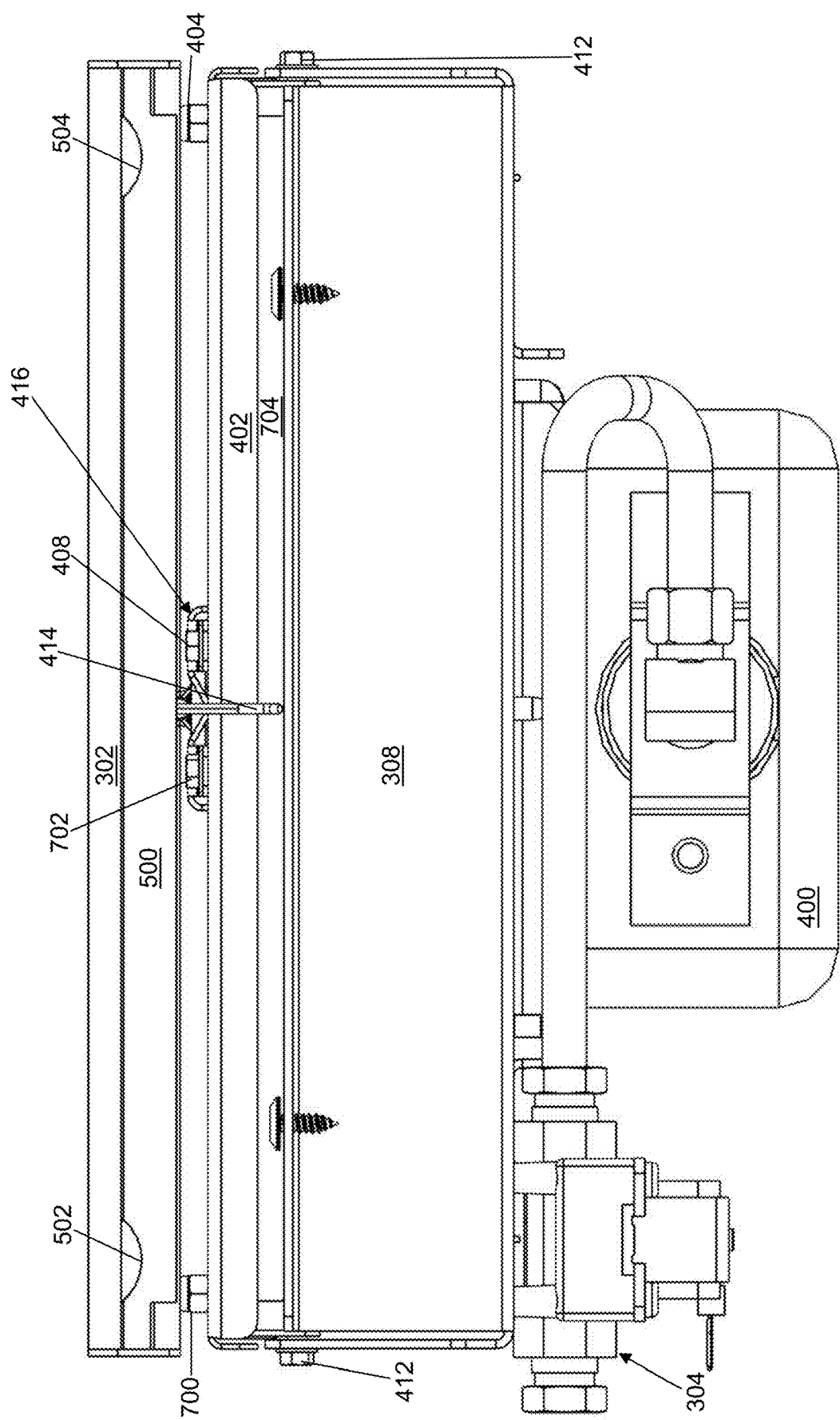
FIG. 7 depicts a front view of the griddle of FIG. 3 with a grease tray removed in accordance with an illustrative embodiment.
Figure 8:
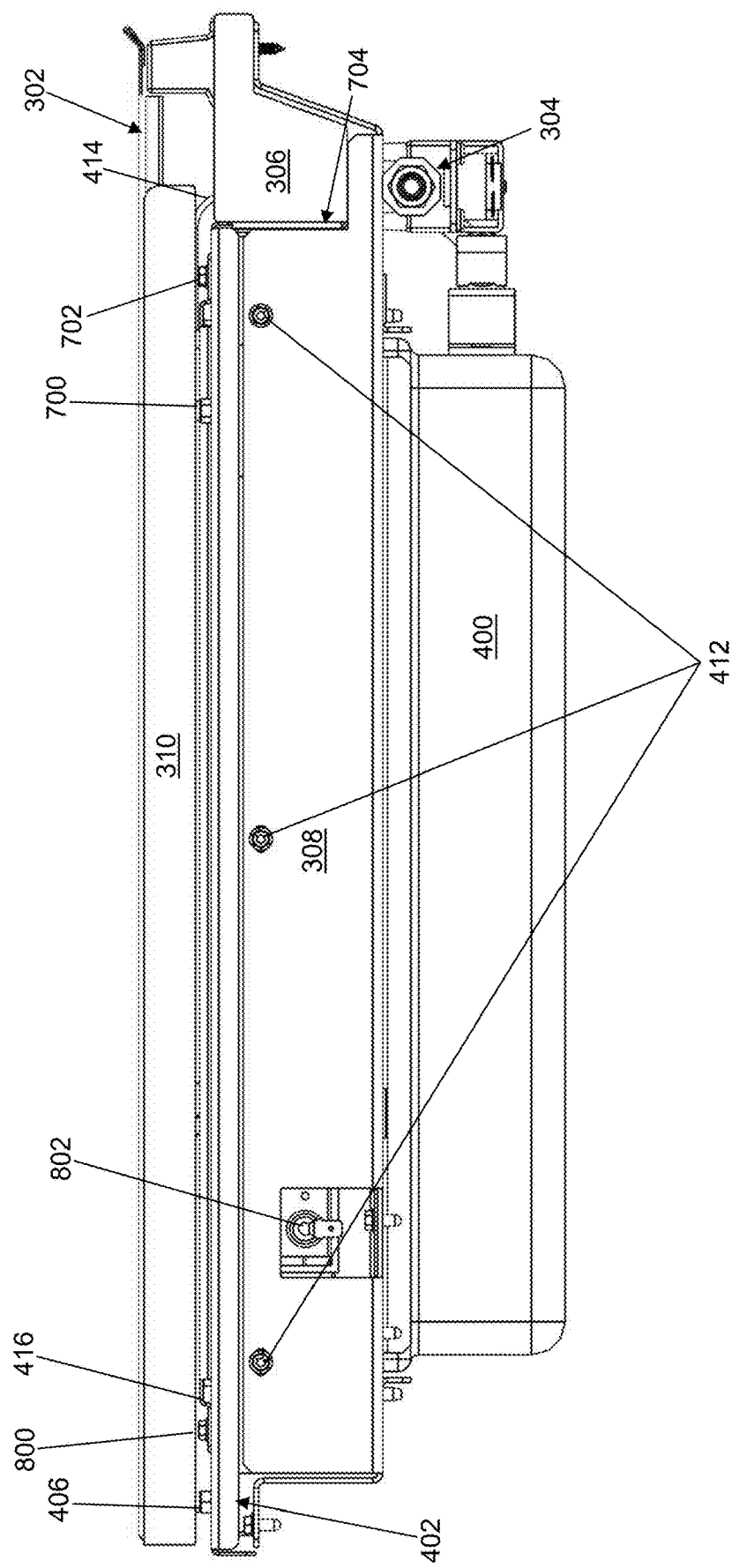
FIG. 8 depicts a left side view of the griddle of FIG. 3 in accordance with an illustrative embodiment.
Figure 9:
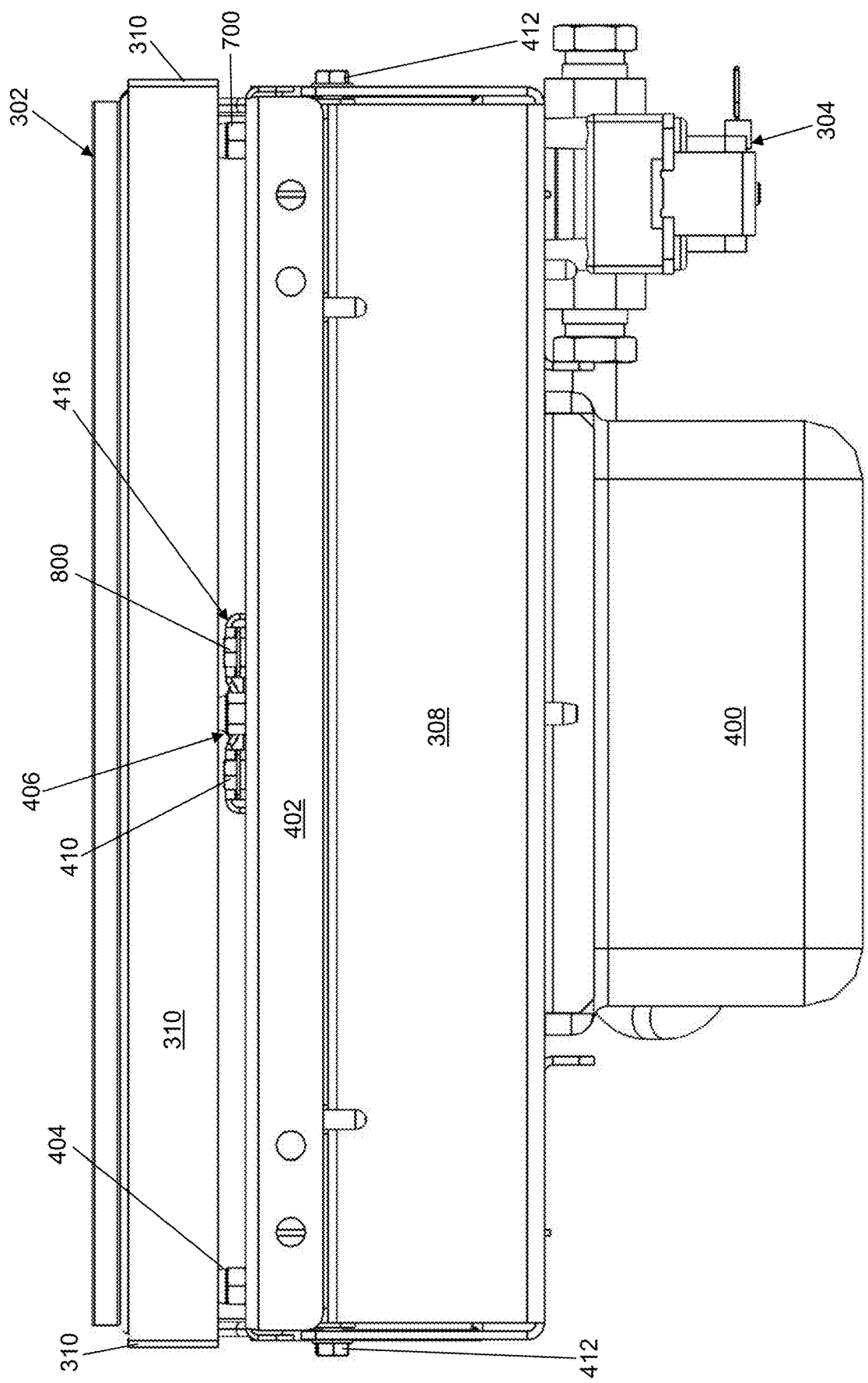
FIG. 9 depicts a back view of the griddle of FIG. 3 in accordance with an illustrative embodiment.
Figure 10:
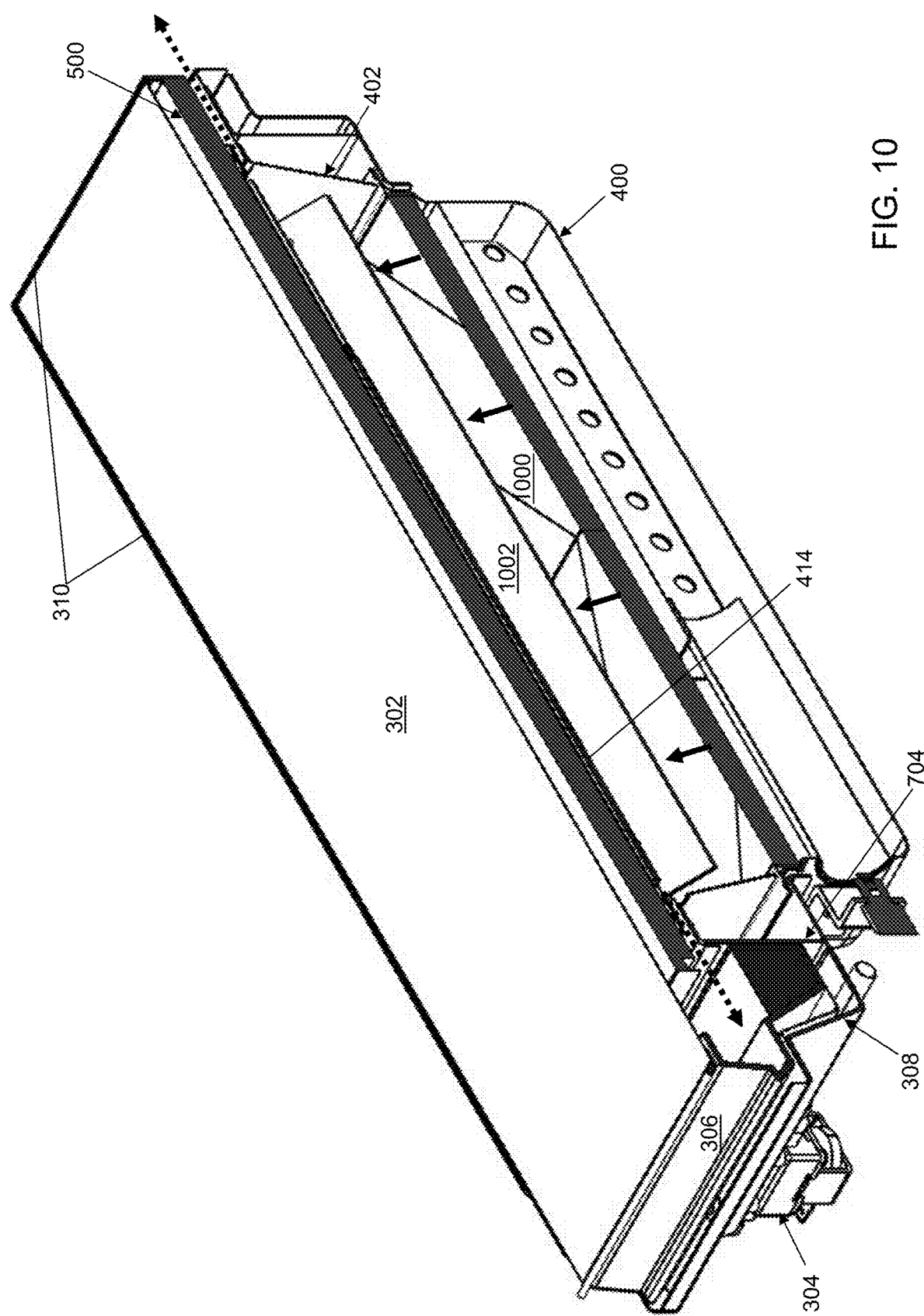
FIG. 10 depicts a right perspective cross-sectional view of the griddle of FIG. 3 in accordance with an illustrative embodiment.
Figure 11:
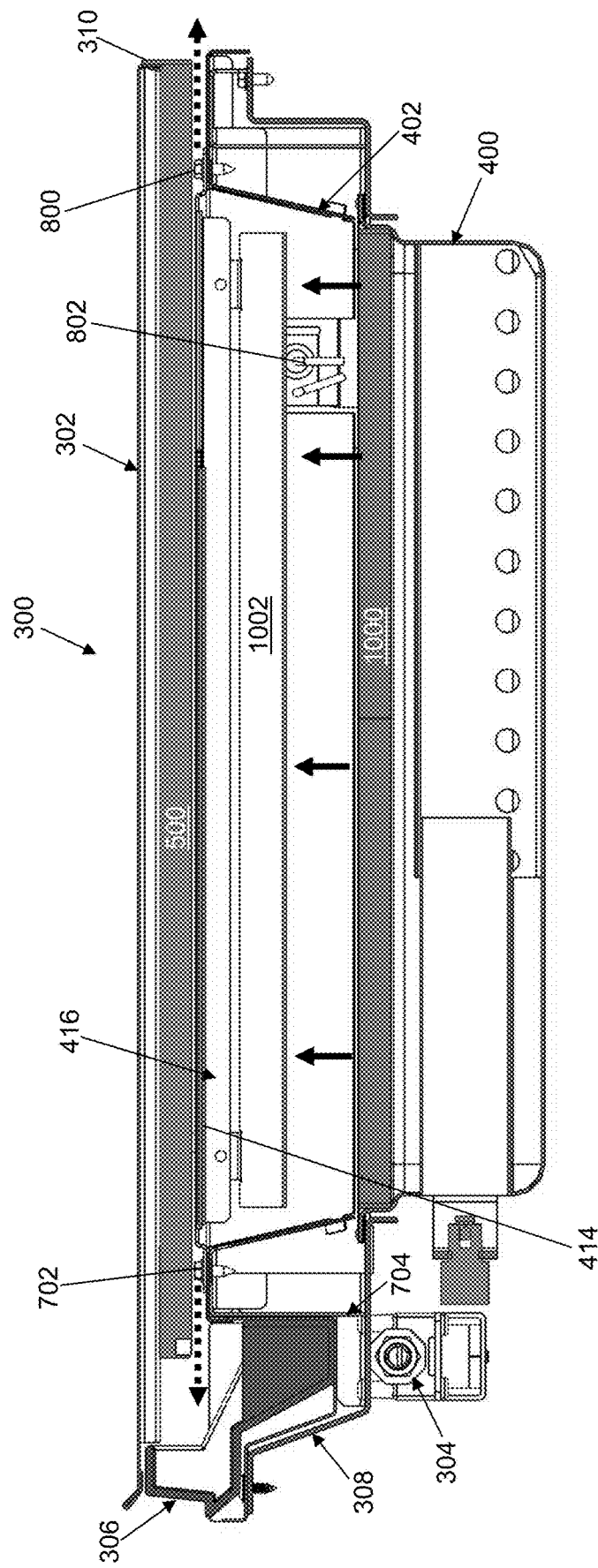
FIG. 11 depicts a right cross-sectional view of the griddle of FIG. 3 in accordance with an illustrative embodiment.
Figure 12A:
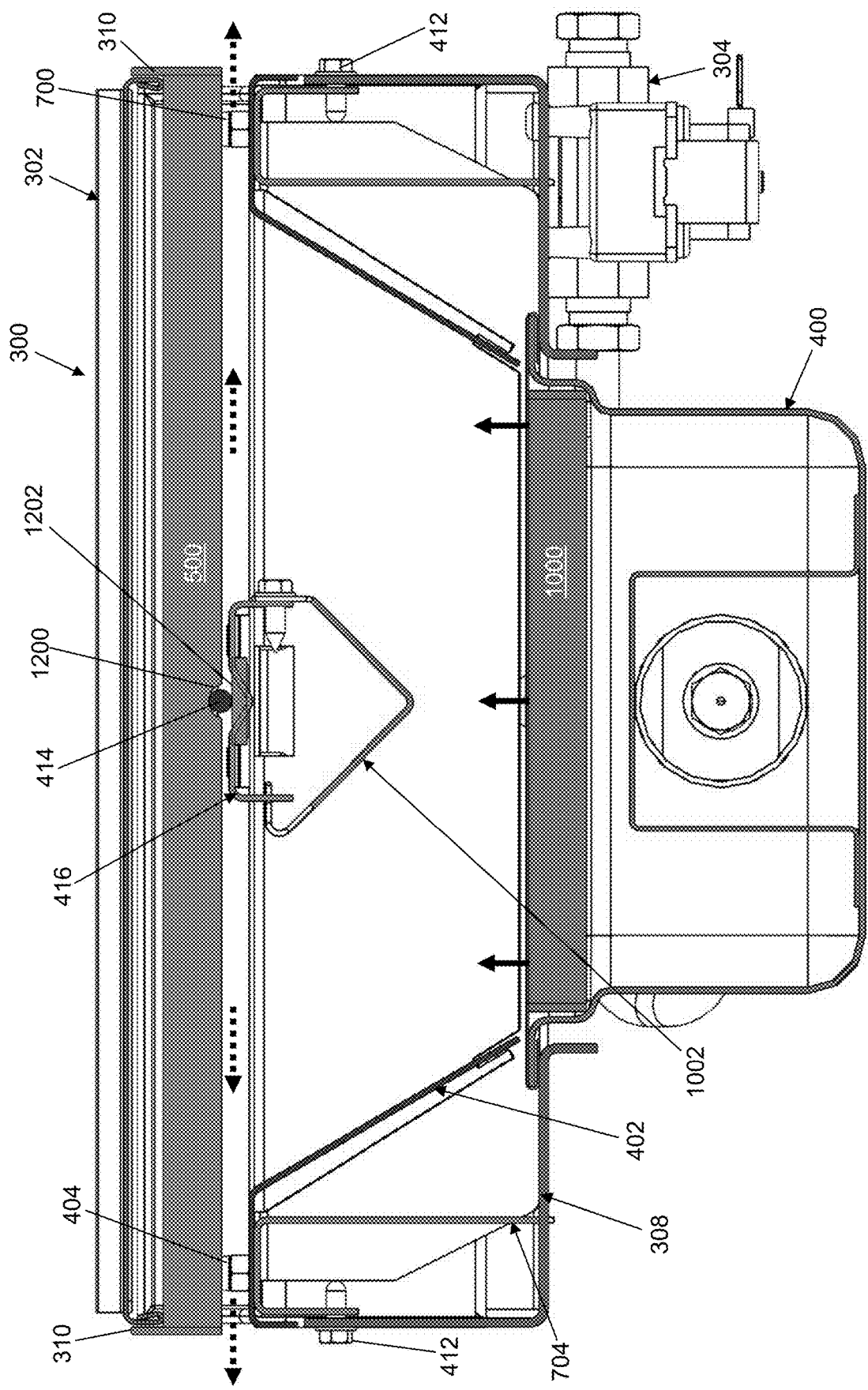
FIG. 12A depicts a back cross-sectional view of the griddle of FIG. 3 in accordance with an illustrative embodiment.
Figure 12B:
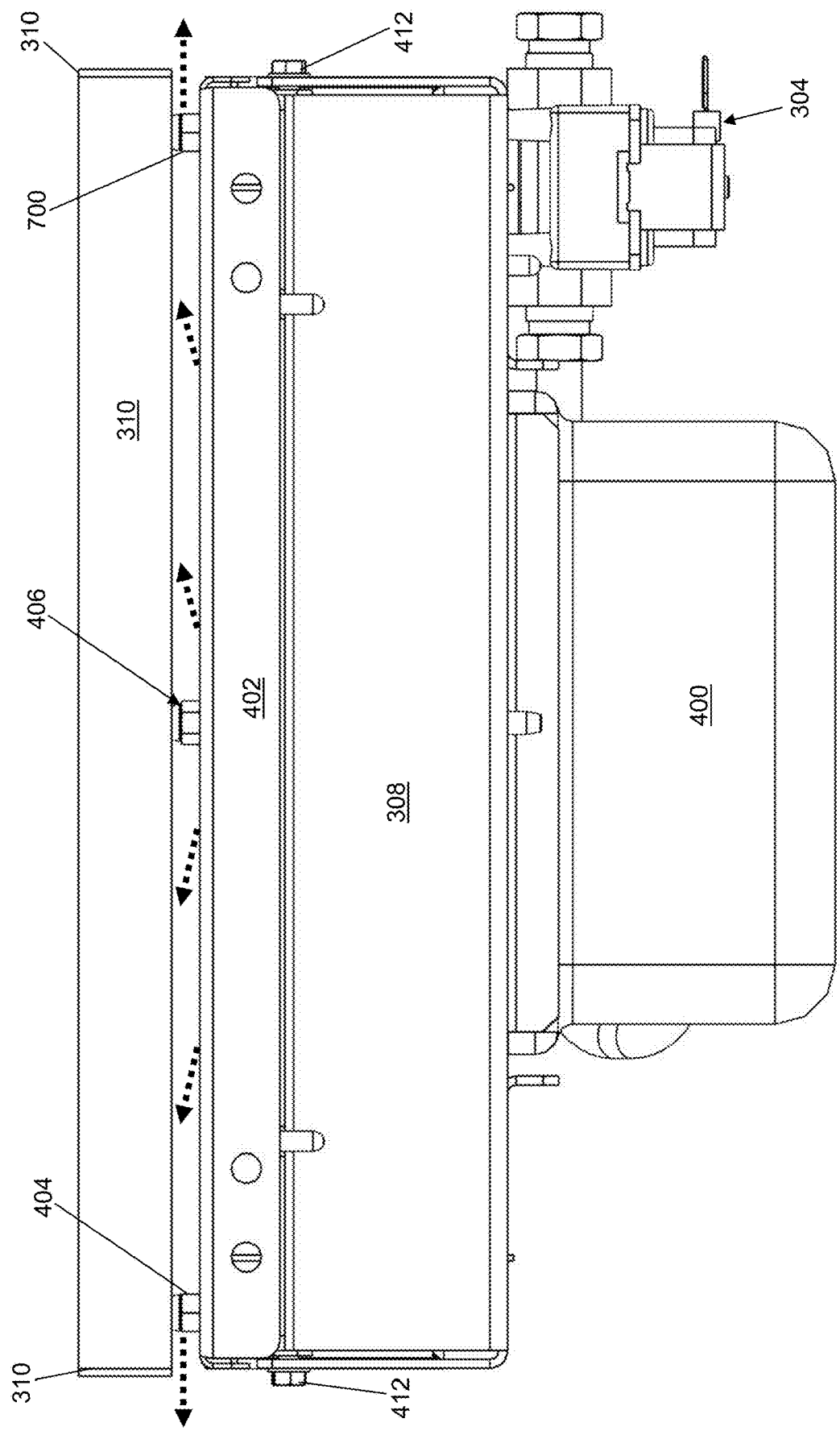
FIG. 12B depicts a back view of the griddle of FIG. 3 with a grease tray removed in accordance with an illustrative embodiment.
Figure 12C:
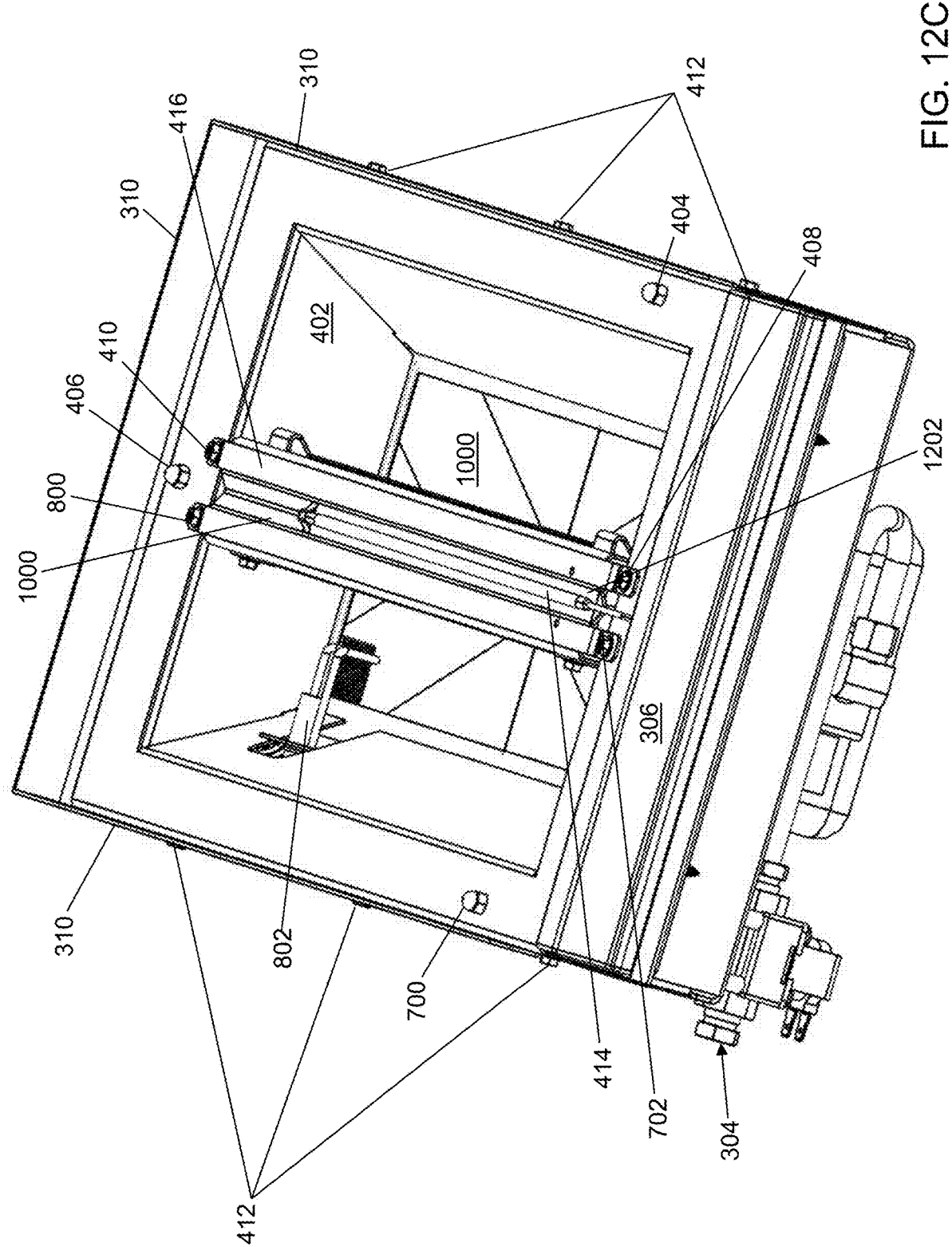
FIG. 12C depicts a top perspective view of the griddle of FIG. 3 with the cover and a griddle plate removed in accordance with an illustrative embodiment.
Figure 13:
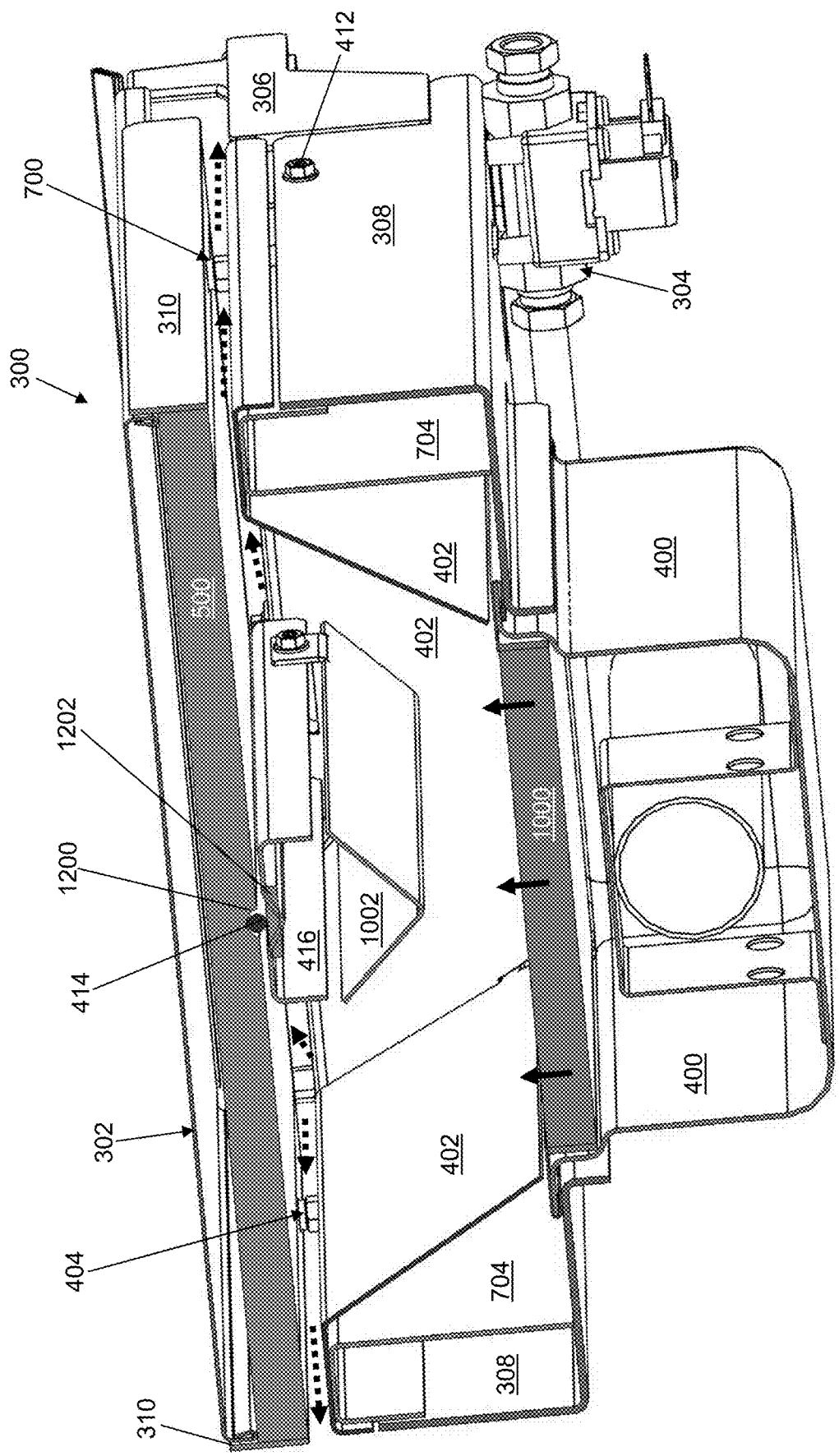
FIG. 13 depicts a back perspective cross-sectional view of the griddle of FIG. 3 in accordance with an illustrative embodiment.
Figure 14:
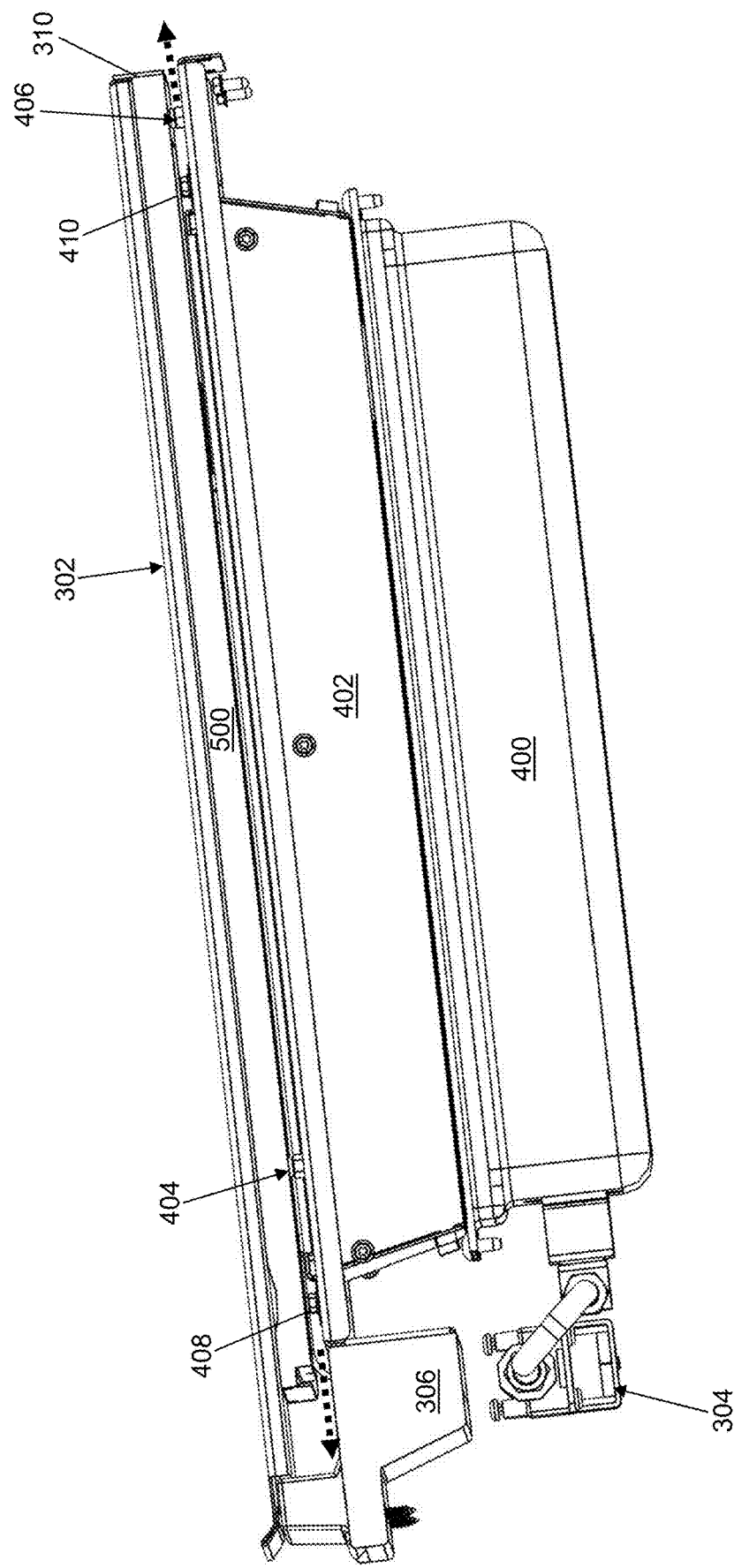
FIG. 14 depicts a right perspective view of the griddle of FIG. 3 with an outer frame and an inner frame removed in accordance with an illustrative embodiment.
Figure 15:
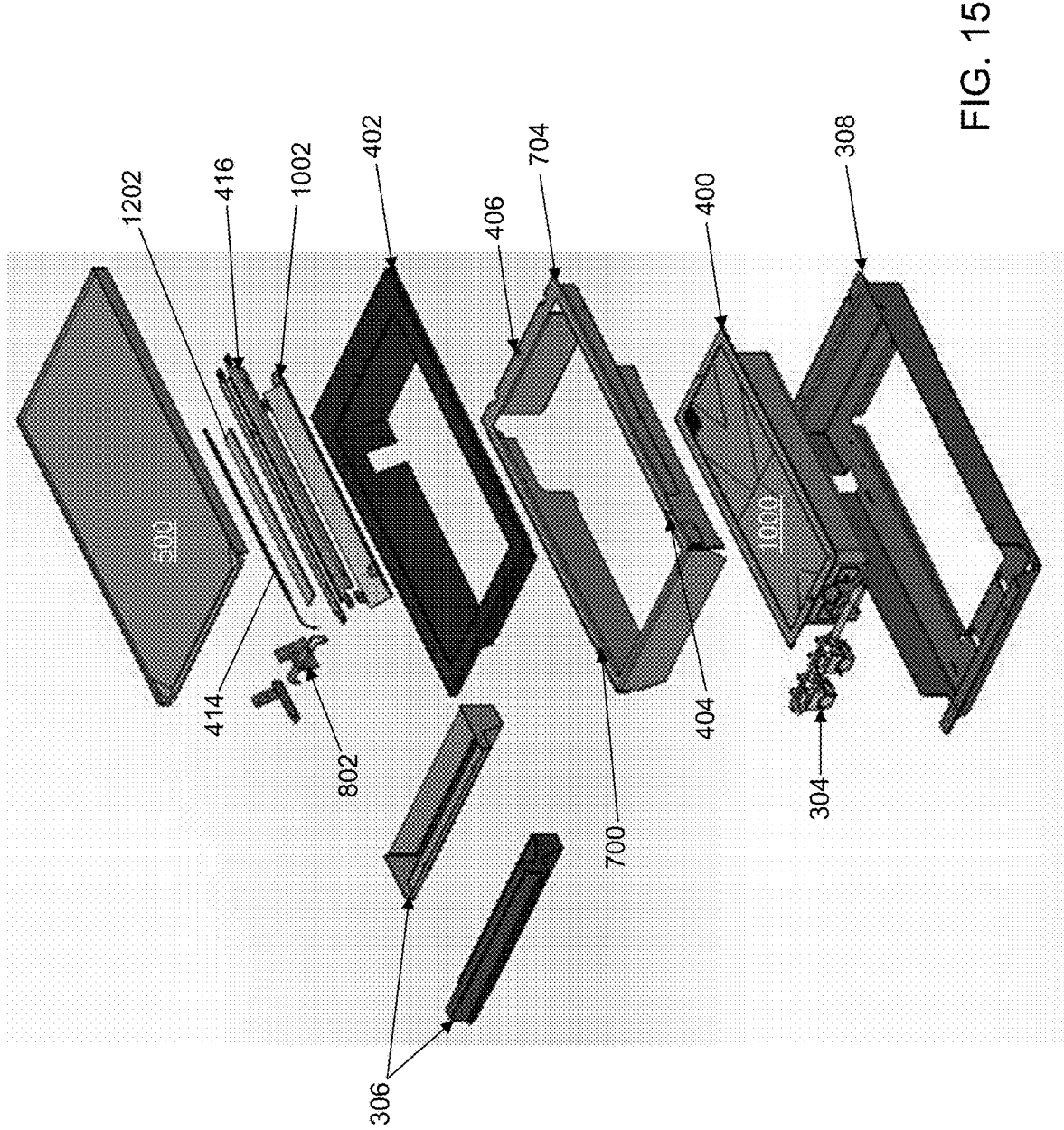
FIG. 15 depicts an exploded, top, front, right perspective view of the griddle of FIG. 3 in accordance with an illustrative embodiment.

Referring to FIG. 3, a top, front, right perspective view is shown of a griddle 300 in accordance with an illustrative embodiment. Referring to FIG. 4, a right side view is shown of griddle 300 in accordance with an illustrative embodiment. Referring to FIG. 5, a top, front, right perspective view is shown of griddle 300 with a cover 302 removed in accordance with an illustrative embodiment. Referring to FIG. 6, a right side view is shown of griddle 300 with cover 302 and griddle plate sidewalls 310 removed in accordance with an illustrative embodiment. Referring to FIG. 7, a front view is shown of griddle 300 with a grease tray 306 removed in accordance with an illustrative embodiment. Referring to FIG. 8, a left side view is shown of griddle 300 in accordance with an illustrative embodiment. Referring to FIG. 9, a back view is shown of griddle 300 in accordance with an illustrative embodiment. Referring to FIG. 10, a right perspective cross-sectional view is shown of griddle 300 in accordance with an illustrative embodiment. Referring to FIG. 11, a right cross-sectional view is shown of griddle 300 in accordance with an illustrative embodiment. Referring to FIG. 12A, a back cross-sectional view is shown of griddle 300 in accordance with an illustrative embodiment. Referring to FIG. 12B, a back view is shown of griddle 300 with grease tray 306 removed in accordance with an illustrative embodiment. Referring to FIG. 12C, a top perspective view is shown of griddle 300 with cover 302 and a griddle plate 500 removed in accordance with an illustrative embodiment. Referring to FIG. 13, a back perspective cross-sectional view is shown of griddle 300 in accordance with an illustrative embodiment. Referring to FIG. 14, a right perspective view is shown of griddle 300 with an outer frame 308 and an inner frame 704 removed in accordance with an illustrative embodiment. Referring to FIG. 15, an exploded, top, front, right perspective view is shown of griddle 300 in accordance with an illustrative embodiment.

Griddle 300 may be mounted in its own housing or integrated in a cooktop such as cooktop 100. In comparison to prior art griddle 108, griddle 300 provides a more even heating of griddle plate 500 because heated air is allowed to exhaust from beneath griddle plate 500 around an entire perimeter as described further below. In comparison to prior art griddle 108, griddle 300 provides a larger cooking surface due to the elimination of griddle vent 116 along a back edge of prior art griddle 108. Elimination of griddle vent 116 along a back edge of prior art griddle 108 also allows cover 302 of griddle 300 to cover an entire top surface of griddle 300 providing an improved griddle aesthetic.

Griddle 300 may include outer frame 308, burner 400, inner frame 704, reflector pan 402, griddle plate 500, cover 302, a valve 304, and grease tray 306. In the illustrative embodiment, burner 400 is an infrared burner that includes a burner plate 1000 positioned above a flame ignited using a burner igniter 802 and maintained by a flow of gas controlled by valve 304 in known fashion. Different types of heating elements may be used in alternative embodiments. For example, illustrative heating elements includes an electric heater, a gas burner, an infrared burner, etc. that are generally referred to as burners herein regardless of the energy source that generates the heat applied to griddle plate 500.

Griddle plate sidewalls 310 are mounted to sidewalls of griddle plate 500 to extend above the sidewalls along a right side, a back side, and a left side to prevent grease or other debris from spilling from griddle plate 500. Grease tray 306 is mounted in front of griddle plate 500 to catch the grease or other debris that spills or is scraped from a griddle plate top surface 1702 (shown referring to FIG. 17B) of griddle plate 500. A first drain trough 502 is formed as a depression in a left, front corner of griddle plate top surface 1702. A second drain trough 504 is formed as a depression in a right, front corner of griddle plate top surface 1702. First drain trough 502 and second drain trough 504 further direct debris from griddle plate top surface 1702 to grease tray 306.

A first gap nut 404, a second gap nut 406, and a third gap nut 700 are mounted between a griddle plate bottom surface 1700 (shown referring to FIG. 17A) of griddle plate 500 and a pan flange 2000 (shown referring to FIG. 20A) of reflector pan 402 to provide a heated air exhaust area around the entire perimeter of griddle plate bottom surface 1700 as shown by the dashed arrows in FIGS. 5, 10, 11, 12A, 12B, and 13.

A thermostat 414 is mounted adjacent griddle plate bottom surface 1700 to measure a temperature of griddle plate 500. A controller (not shown) adjusts a flow of gas to burner 400 to maintain the temperature measured by thermostat 414 at a desired temperature indicated by the user using griddle control knob 114. As best seen in FIG. 12C, thermostat 414 is mounted adjacent griddle plate bottom surface 1700 using a thermostat bracket 416 that is mounted to pan flange 2000 of reflector pan 402 using a first bracket fastener 408, a second bracket fastener 410, a third bracket fastener 702, and a fourth bracket fastener 800 inserted through bracket fastener aperture walls 2108 (shown referring to FIG. 21A) and into pan bracket fastener aperture walls 2018 (shown referring to FIG. 20A) of reflector pan 402. A thermostat heat shield 1202 is mounted on thermostat bracket 416 below thermostat 414 to improve the temperature measurement of griddle plate 500. A thermostat deflector plate 1002 is mounted to thermostat bracket 416 to divert heated air from directly impinging on thermostat 414.

Figure 16:
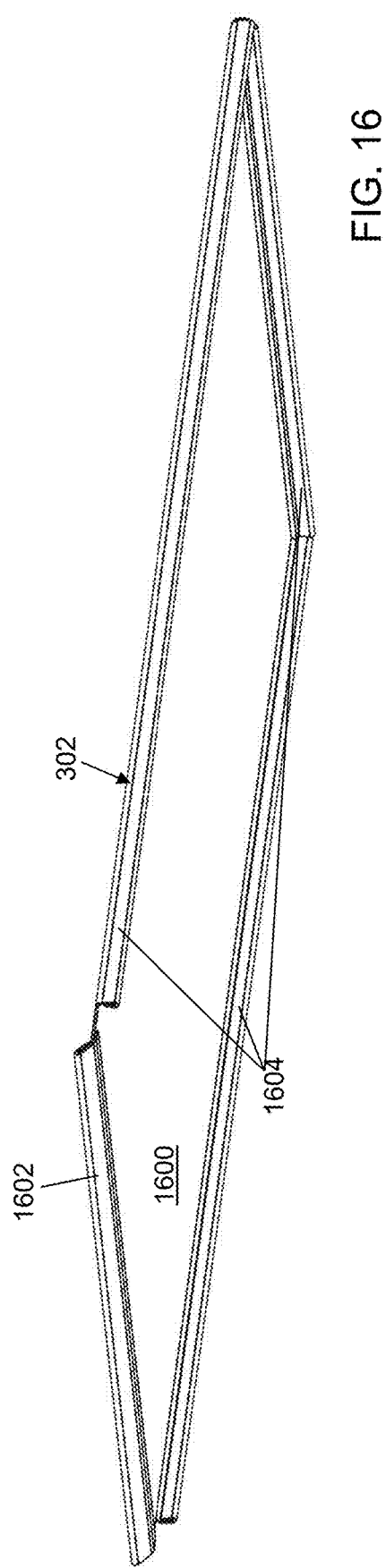
FIG. 16 depicts a bottom, front, right perspective view of the cover of the griddle of FIG. 3 in accordance with an illustrative embodiment.

Referring to FIG. 16, a bottom, front, right perspective view is shown of cover 302 in accordance with an illustrative embodiment. Cover 302 may include a cover top 1600, a cover handle 1602, and cover sidewalls 1604. Cover handle 1602 extends upward at an angle from a front edge of cover top 1600 and rests on a top surface of grease tray 306 when mounted on griddle 300. Cover handle 1602 provides a surface that can be used by a user to lift up and/or remove cover 302 from griddle 300. Cover sidewalls 1604 extend downward from a right edge, a left edge, and a back edge of cover top 1600. The cover sidewalls 1604 fit within griddle plate sidewalls 310 and rest on griddle plate top surface 1702 in the illustrative embodiment.

Figure 17A:
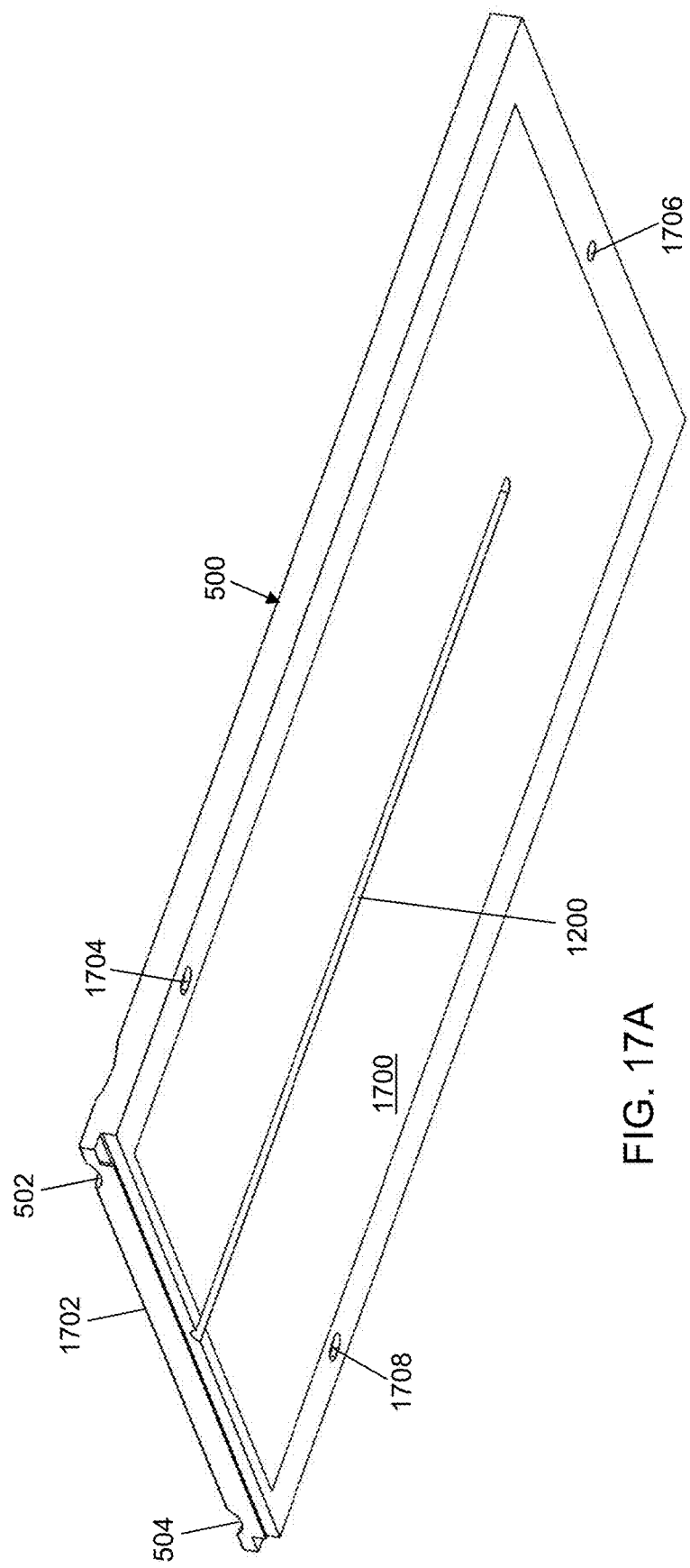
FIG. 17A depicts a bottom, front, right perspective view of the griddle plate of the griddle of FIG. 3 in accordance with an illustrative embodiment.
Figure 17B:
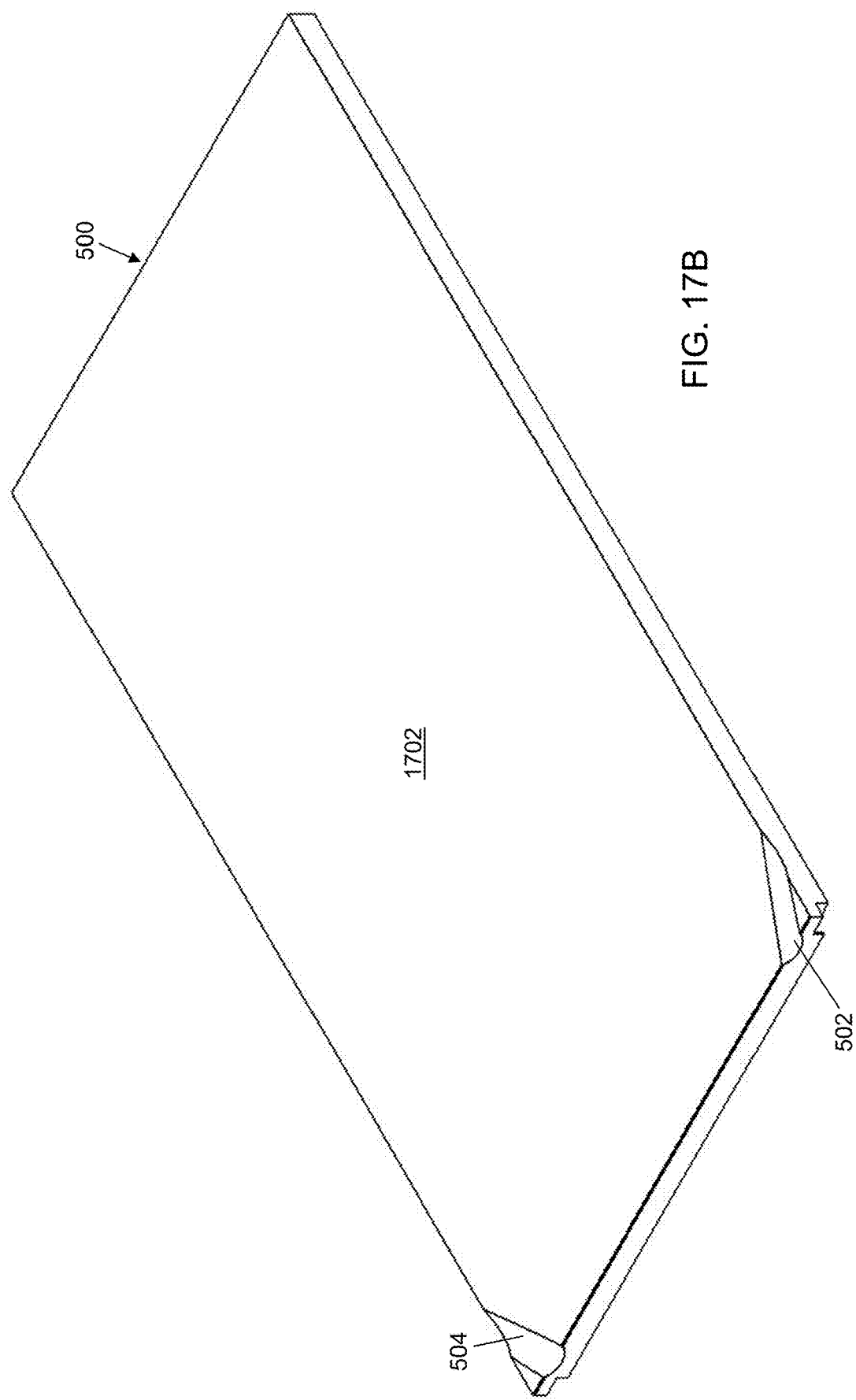
FIG. 17B depicts a top, front, right perspective view of the griddle plate of FIG. 17A in accordance with an illustrative embodiment.

Referring to FIG. 17A, a bottom, front, right perspective view is shown of griddle plate 500 in accordance with an illustrative embodiment. Referring to FIG. 17B, a top, front, right perspective view is shown of griddle plate 500 in accordance with an illustrative embodiment. Griddle plate 500 may include griddle plate top surface 1702, griddle plate bottom surface 1700, first drain trough 502, second drain trough 504, a first gap nut aperture wall 1704, a second gap nut aperture wall 1706, a third gap nut aperture wall 1708, and a thermostat trough 1200. Thermostat trough 1200 is formed as a depression in griddle plate bottom surface 1700. As best seen in FIG. 12A, thermostat 414 fits within thermostat trough 1200 to improve the temperature measurement. Thermostat trough 1200 extends from a front edge of griddle plate 500 approximately a length of a sensing portion of thermostat 414.

First gap nut aperture wall 1704, second gap nut aperture wall 1706, and third gap nut aperture wall 1708 form holes in griddle plate bottom surface 1700. First gap nut aperture wall 1704, second gap nut aperture wall 1706, and third gap nut aperture wall 1708 are sized, shaped, and positioned to allow insertion therein of at least a portion of nut head 2400 of first gap nut 404, of nut head 2400 of second gap nut 406, and of nut head 2400 of third gap nut 700, respectively, when the griddle plate is mounted above reflector pan 402.

Figure 18:
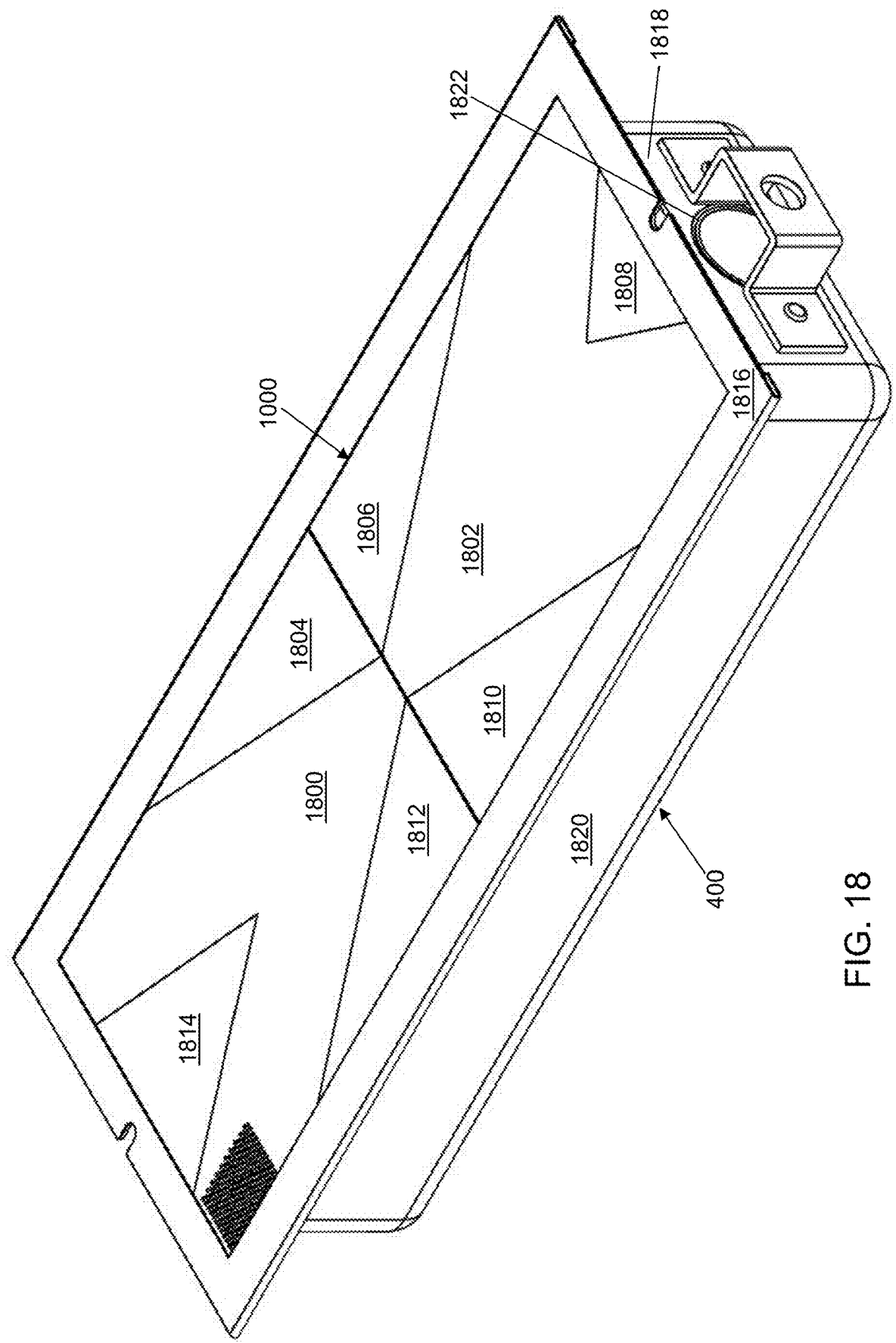
FIG. 18 depicts a top, front, left perspective view of a heating element of the griddle of FIG. 3 in accordance with an illustrative embodiment.

Referring to FIG. 18, a top, front, left perspective view is shown of burner 400 in accordance with an illustrative embodiment. Burner 400 may include a housing comprised of a housing flange 1816, a first housing sidewall (not shown), a second housing sidewall 1818, a third housing sidewall 1820, a fourth housing sidewall (not shown), and a bottom sidewall (not shown). Housing flange 1816 extends generally perpendicularly from a top edge of each of the first housing sidewall, second housing sidewall 1818, third housing sidewall 1820, and the fourth housing sidewall. A burner element (not shown) is mounted below burner plate 1000 in a cavity defined by the first housing sidewall, second housing sidewall 1818, third housing sidewall 1820, the fourth housing sidewall, and the bottom sidewall. Burner plate 1000 is supported by housing flange 1816 and forms an interior of a top wall of the housing of burner 400. A burner-gas line aperture wall 1822 is formed through approximately a center of second housing sidewall 1818 that is a front sidewall relative to the orientations shown and described in the figures. Tubes connect valve 304 to the burner element some of which extend through burner-gas line aperture wall 1822.

Burner plate 1000 may include a first heat area 1800, a second heat area 1802, a first non-heat area 1804, a second non-heat area 1806, a third non-heat area 1808, a fourth non-heat area 1810, a fifth non-heat area 1812, and a sixth non-heat area 1814. A blank-off area is defined by first non-heat area 1804, second non-heat area 1806, third non-heat area 1808, fourth non-heat area 1810, fifth non-heat area 1812, and sixth non-heat area 1814 that do not radiate heat from the burner element; whereas, first heat area 1800 and second heat area 1802 radiate heat from the burner element. First heat area 1800, second heat area 1802, first non-heat area 1804, second non-heat area 1806, third non-heat area 1808, fourth non-heat area 1810, fifth non-heat area 1812, and sixth non-heat area 1814 are designed to provide an approximately equal heat distribution on griddle plate bottom surface 1700. Other patterns may be used in alternative embodiments based on characteristics of the burner element and griddle plate 500.

Figure 19:
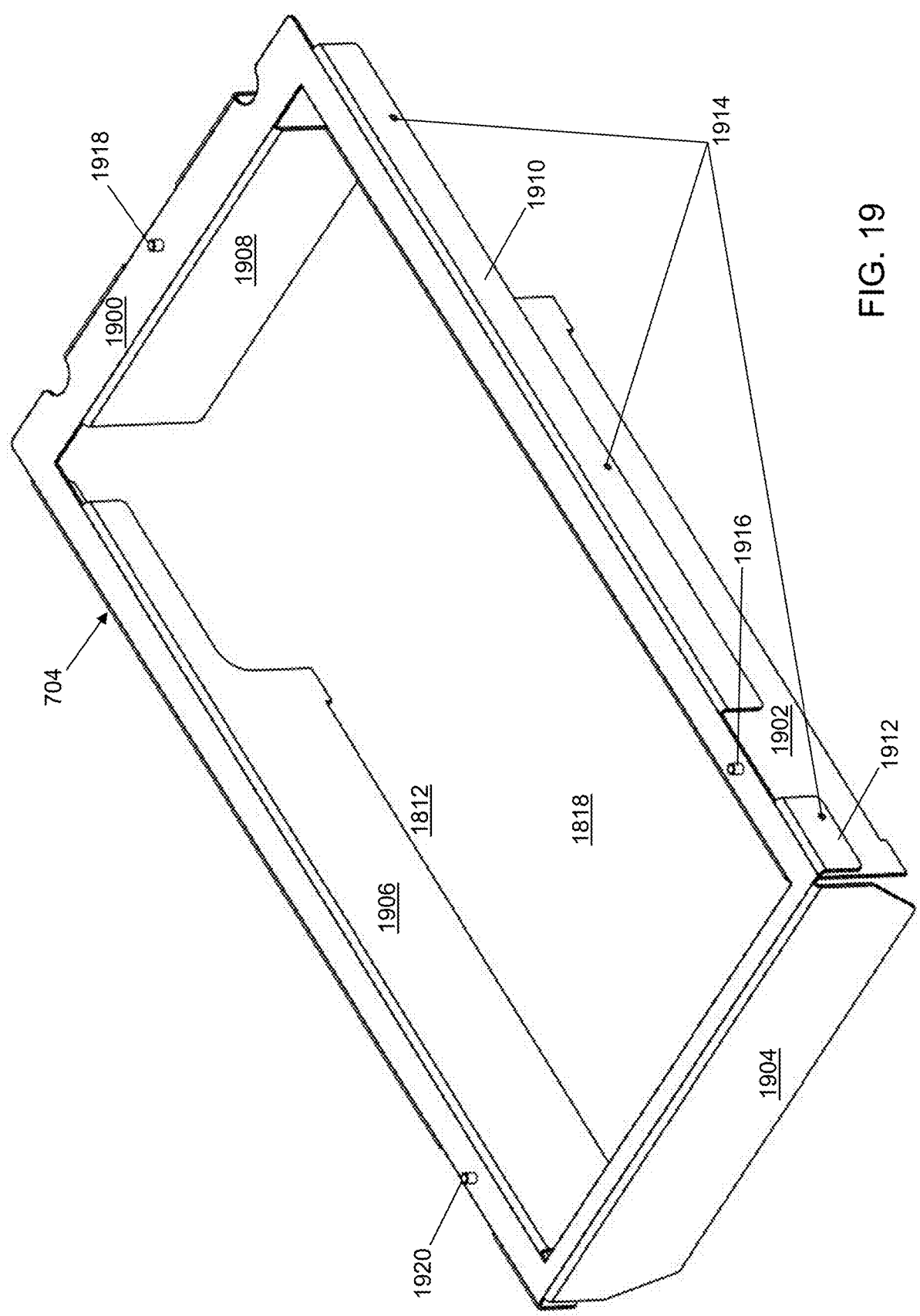
FIG. 19 depicts a top, front, right perspective view of the inner frame of the griddle of FIG. 3 in accordance with an illustrative embodiment.

Referring to FIG. 19, a top, front, right perspective view is shown of inner frame 704 in accordance with an illustrative embodiment. Inner frame 704 may include a top flange 1900, a first sidewall 1902, a second sidewall 1904, a third sidewall 1906, a fourth sidewall 1908, a first side flange 1910, a second side flange 1912, a third side flange (not shown), a fourth side flange (not shown). Top flange 1900 extends generally perpendicularly from a top edge of each of first sidewall 1902, second sidewall 1904, third sidewall 1906, and fourth sidewall 1908. First side flange 1910 and second side flange 1912 extend generally perpendicularly from top flange 1900 on an edge of top flange 1900 opposite the edge from which first sidewall 1902 extends from top flange 1900. Similarly, the third side flange and the fourth side flange extend generally perpendicularly from top flange 1900 on an edge of top flange 1900 opposite the edge from which third sidewall 1906 extends from top flange 1900. First frame fastener aperture walls 1914 define holes formed through first side flange 1910, second side flange 1912, the third side flange, and the fourth side flange.

A first stud 1916, a second stud 1918, and a third stud 1920 extend upwards from top flange 1900. First gap nut 404 is sized and shaped to be mounted on first stud 1916. Second gap nut 406 is sized and shaped to be mounted on second stud 1918. Third gap nut 700 is sized and shaped to be mounted on third stud 1920.

Figure 20A:
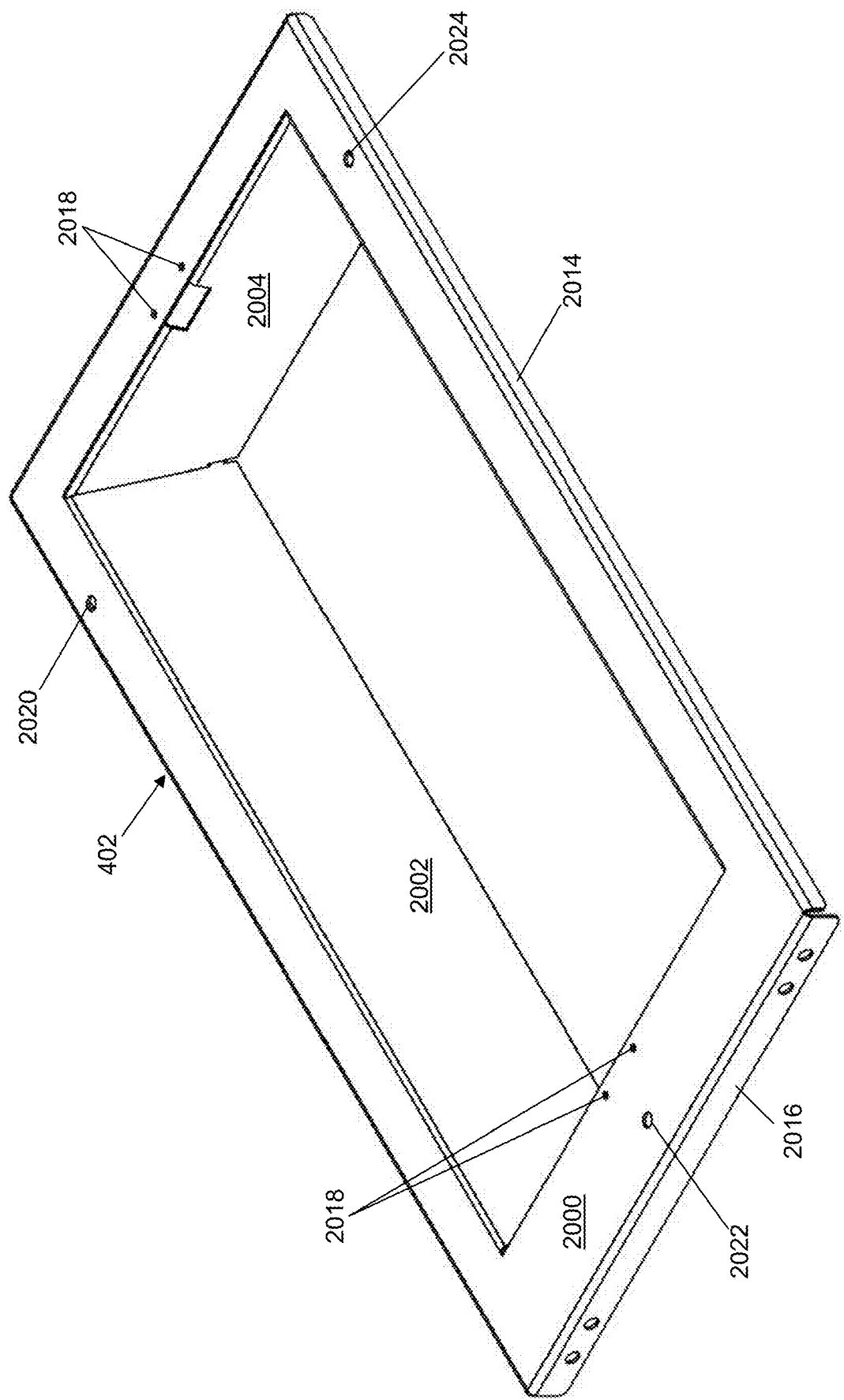
FIG. 20A depicts a top, back, left perspective view of a reflector pan of the griddle of FIG. 3 in accordance with an illustrative embodiment.
Figure 20B:
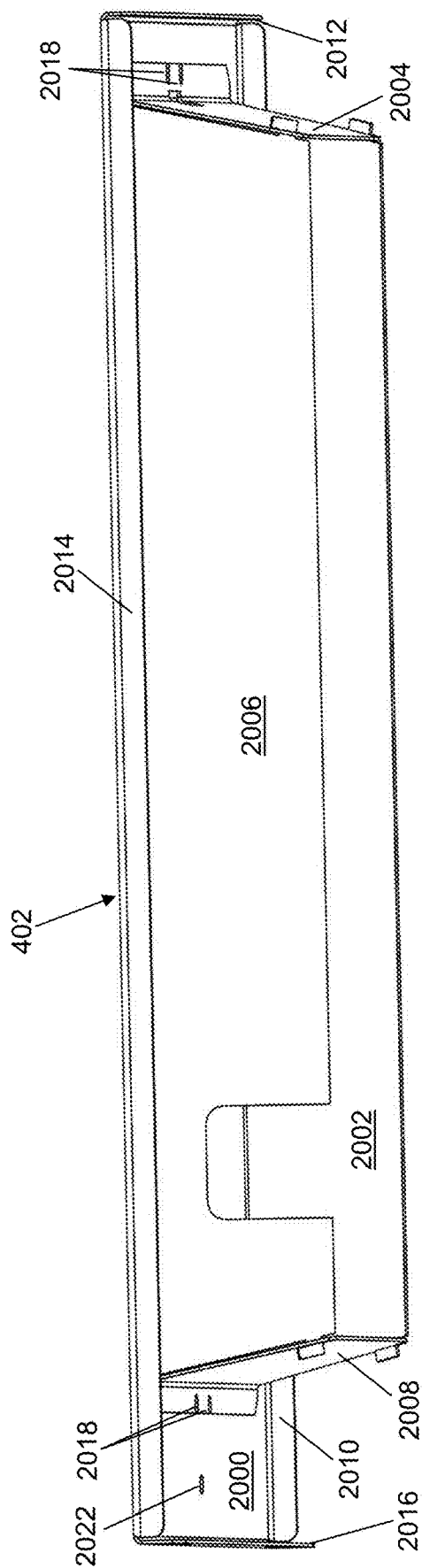
FIG. 20B depicts a bottom, back, left perspective view of the reflector pan of FIG. 20A in accordance with an illustrative embodiment.
Figure 20C:
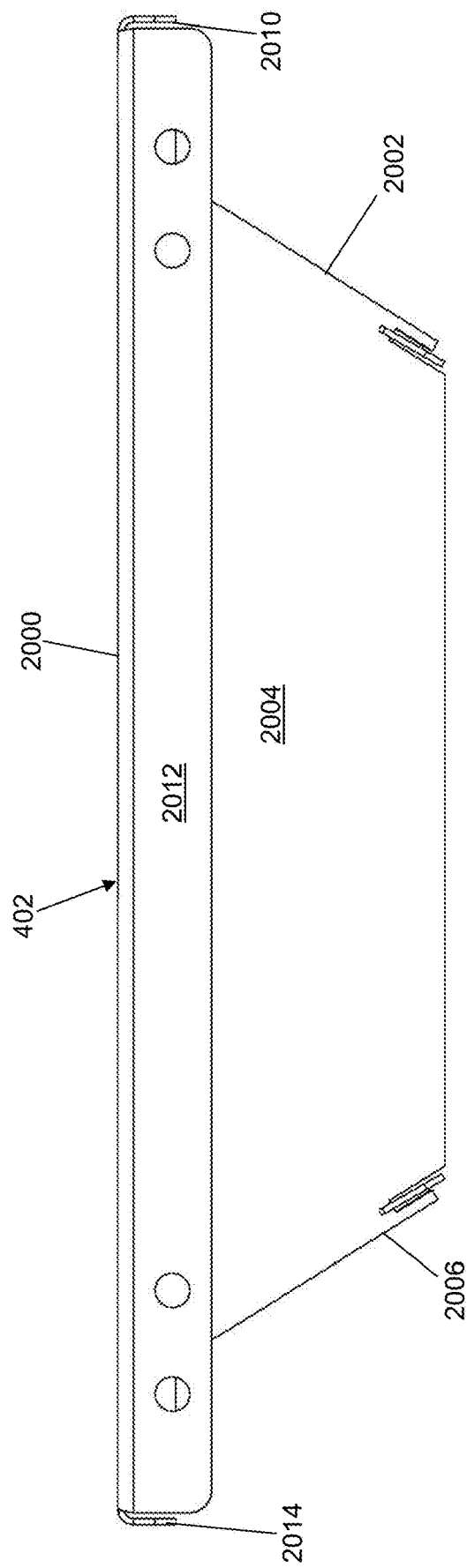
FIG. 20C depicts a back view of the reflector pan of FIG. 20A in accordance with an illustrative embodiment.

Referring to FIG. 20A, a top, back, left perspective view is shown of reflector pan 402 in accordance with an illustrative embodiment. Referring to FIG. 20B, a bottom, back, left perspective view is shown of reflector pan 402 in accordance with an illustrative embodiment. Referring to FIG. 20C, a back view is shown of reflector pan 402 in accordance with an illustrative embodiment. Reflector pan 402 may include a pan flange 2000, a first pan sidewall 2002, a second pan sidewall 2004, a third pan sidewall 2006, a fourth pan sidewall 2008, a first pan flange 2010, a second pan flange 2012, a third pan flange 2014, and a fourth pan flange 2016. First pan sidewall 2002, second pan sidewall 2004, third pan sidewall 2006, and fourth pan sidewall 2008 are sloped outward from bottom edges that define an aperture similar in size and shape to burner plate 1000 to top edges that define an aperture similar in size and shape to fit within an interior of top flange 1900 of inner frame 704. The sloped first pan sidewall 2002, second pan sidewall 2004, third pan sidewall 2006, and fourth pan sidewall 2008 act as a funnel to distribute and direct the heated air from burner plate 1000 across griddle plate bottom surface 1700.

Pan flange 2000 extends generally perpendicularly from a top edge of each of first pan sidewall 2002, second pan sidewall 2004, third pan sidewall 2006, and fourth pan sidewall 2008. First pan flange 2010 extends generally perpendicularly from pan flange 2000 on an edge of pan flange 2000 opposite the edge from which first pan sidewall 2002 extends from pan flange 2000. Second pan flange 2012 extends generally perpendicularly from pan flange 2000 on an edge of pan flange 2000 opposite the edge from which second pan sidewall 2004 extends from pan flange 2000. Third pan flange 2014 extends generally perpendicularly from pan flange 2000 on an edge of pan flange 2000 opposite the edge from which third pan sidewall 2006 extends from pan flange 2000. Fourth pan sidewall 2008 extends generally perpendicularly from pan flange 2000 on an edge of pan flange 2000 opposite the edge from which fourth pan sidewall 2008 extends from pan flange 2000. A width of pan flange 2000 between each pan sidewall and each pan flange is selected to fit over and rest on top flange 1900 of inner frame 704. The width of pan flange 2000 may further be selected to fit within griddle plate sidewalls 310.

Pan bracket fastener aperture walls 2018 define holes formed through pan flange 2000 and are sized, shaped, and positioned to accept first bracket fastener 408, second bracket fastener 410, third bracket fastener 702, and fourth bracket fastener 800 therethrough. A first stud aperture wall 2020, a second stud aperture wall 2022, a third stud aperture wall 2024 define holes formed through pan flange 2000 and are sized, shaped, and positioned to accept first stud 1916, second stud 1918, and third stud 1920, respectively therethrough, so that pan flange 2000 rests on top flange 1900 of inner frame 704.

Figure 21A:
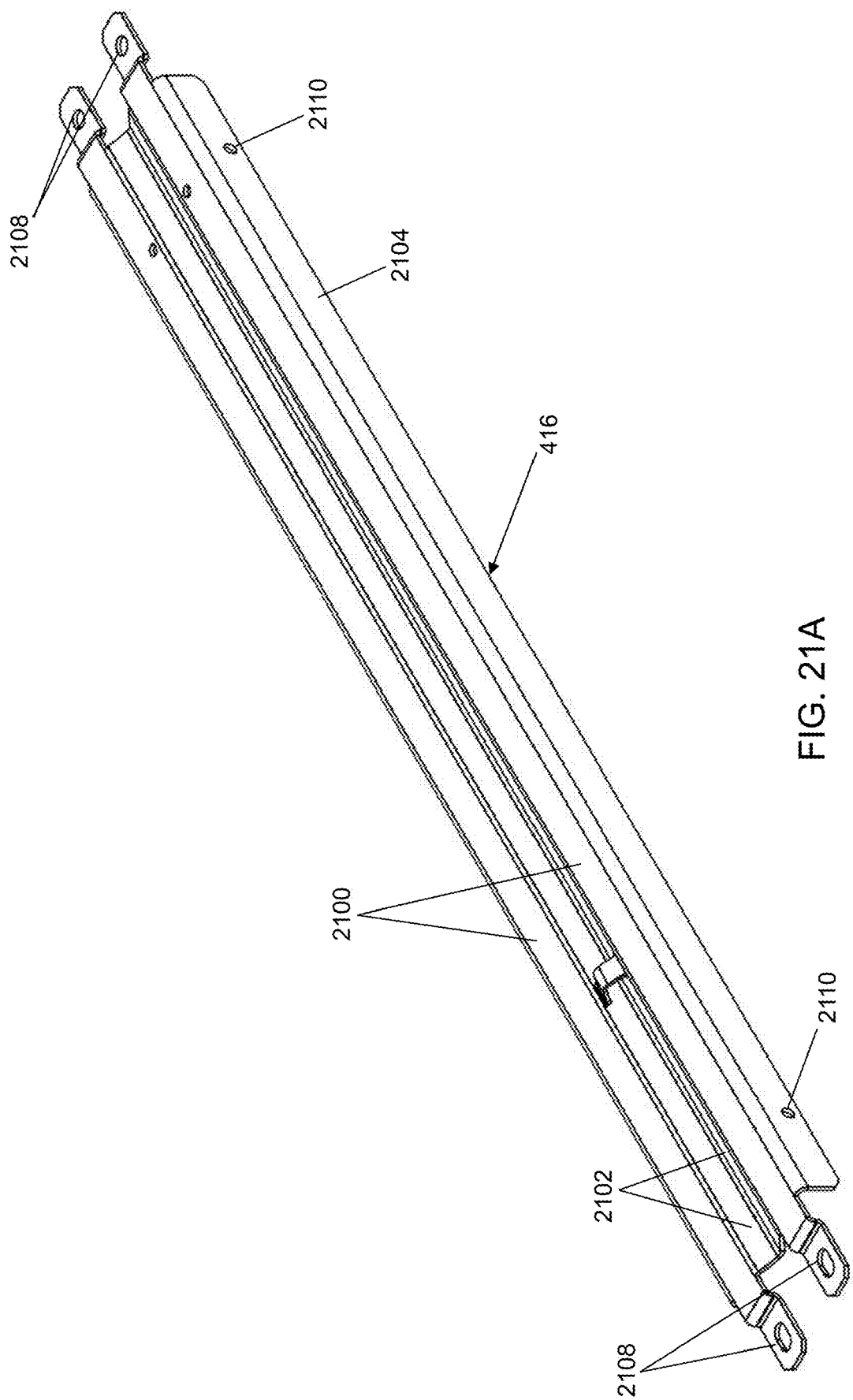
FIG. 21A depicts a top, back, left perspective view of a thermostat bracket of the griddle of FIG. 3 in accordance with an illustrative embodiment.

Referring to FIG. 21A, a top, back, left perspective view is shown of thermostat bracket 416 in accordance with an illustrative embodiment. Referring to FIG. 21B, a top, front, right perspective view is shown of thermostat bracket 416 in accordance with an illustrative embodiment. Thermostat bracket 416 may include bracket walls 2100, bracket trough walls 2102, first bracket flange 2104, second bracket flange 2106, bracket fastener aperture walls 2108, first deflector fastener aperture walls 2110, and deflector tab aperture walls 2112. Bracket walls 2100 extend lengthwise and include prongs at each end. Bracket fastener aperture walls 2108 define holes formed through the prongs at each end of bracket walls 2100 that are sized, shaped, and positioned to accept first bracket fastener 408, second bracket fastener 410, third bracket fastener 702, and fourth bracket fastener 800 therethrough and to align with pan bracket fastener aperture walls 2018 to mount thermostat bracket 416 to reflector pan 402. Bracket trough walls 2102 are sloped downward between inner edges of bracket walls 2100 and toward a common edge to form a trough. Thermostat heat shield 1202 fits between and is supported by bracket trough walls 2102.

First bracket flange 2104 extends generally perpendicularly from bracket walls 2100 on an edge of bracket walls 2100 opposite the edge from which a first wall of the bracket trough walls 2102 extends from bracket walls 2100. Second bracket flange 2106 extends generally perpendicularly from bracket walls 2100 on an edge of bracket walls 2100 opposite the edge from which a second wall of the bracket trough walls 2102 extends from bracket walls 2100. First deflector fastener aperture walls 2110 define holes formed through first bracket flange 2104 and are sized, shaped, and positioned to accept fasteners (not shown) that mount heat deflector 1002 to thermostat bracket 416. Deflector tab aperture walls 2112 define tab holes formed through second bracket flange 2106 and are sized, shaped, and positioned to accept tabs 2208 of heat deflector 1002 that further mount heat deflector 1002 to thermostat bracket 416.

Referring to FIG. 22, a top, front, right perspective view is shown of heat deflector 1002 in accordance with an illustrative embodiment. Heat deflector 1002 may include a first trough wall 2200, a second trough wall 2202, deflector mounting walls 2204, second deflector fastener aperture walls 2206, and tabs 2208. First trough wall 2200 is sloped downward toward an inner edge of second trough wall 2202, and second trough wall 2202 is sloped downward toward an inner edge of first trough wall 2200 to form a common edge and a second trough.

Deflector mounting walls 2204 extend upward from portions of an upper edge of first trough wall 2200 opposite the inner edge of first trough wall 2200. Second deflector fastener aperture walls 2204 define holes formed through deflector mounting walls 2204 and are sized, shaped, and positioned to accept fasteners (not shown) that mount heat deflector 1002 to thermostat bracket 416. Second deflector fastener aperture walls 2204 align with first deflector fastener aperture walls 2110 when heat deflector 1002 is mounted to thermostat bracket 416. Tabs 2208 extend inward from portions of an upper edge of second trough wall 2202 opposite the inner edge of second trough wall 2202.

Referring to FIG. 23, a top, front, left perspective view is shown of outer frame 308 in accordance with an illustrative embodiment. Outer frame 308 may include a bottom wall 2300, a first outer sidewall 2302, a second outer sidewall 2304, a third outer sidewall 2306, a fourth outer sidewall 2308, a first support flange 2312, and a second support flange 2314. First outer sidewall 2302, second outer sidewall 2304, third outer sidewall 2306, and fourth outer sidewall 2308 extend generally perpendicularly upward from outer edges of bottom wall 2300 to define an aperture within which inner frame 704 fits.

Bottom wall 2300 defines an aperture sized and shaped to allow insertion of the first housing sidewall, second housing sidewall 1818, third housing sidewall 1820, the fourth housing sidewall, and the bottom sidewall of burner 400 therethrough. The aperture defined by bottom wall 2300 is further sized and shaped so that housing flange 1816 of burner 400 rests on an interior surface thereof to support burner 400. Fasteners (not shown) may further mount burner 400 to outer frame 308.

Second frame fastener aperture walls 2310 define holes formed through first outer sidewall 2302 and third outer sidewall 2306 and are sized, shaped, and positioned to accept frame fasteners 412 that mount outer frame 308 to inner frame 704. Frame fasteners 412 are inserted through first frame fastener aperture walls 1914 of inner frame 704 and second frame fastener aperture walls 2310 that are aligned with each other when inner frame 704 is mounted to outer frame 308.

Second outer sidewall 2304 is a front wall of outer frame 308 based on the orientations shown and described in the figures. Second outer sidewall 2304 slopes away from bottom wall 2300 to accommodate grease tray 306. Apertures are cut in front portions of first outer sidewall 2302 and third outer sidewall 2306 to accommodate grease tray 306 below a front edge of griddle plate 500. First support flange 2312 extends generally perpendicularly from second outer sidewall 2304 on an edge of second outer sidewall 2304 opposite the edge from which second outer sidewall 2304 extends from bottom wall 2300. Grease tray 306 is supported by first support flange 2312. Fasteners (not shown) may further mount grease tray 306 to outer frame 308.

Fourth outer sidewall 2308 is a back wall of outer frame 308 based on the orientations shown and described in the figures. Second support flange 2314 extends generally perpendicularly from fourth outer sidewall 2308 on an edge of fourth outer sidewall 2308 opposite the edge from which fourth outer sidewall 2308 extends from bottom wall 2300. Inner frame 704 is supported by second support flange 2314.

An igniter aperture wall 2316 is formed in third outer sidewall 2306. Igniter aperture wall 2316 defines an aperture through which burner igniter 802 is mounted adjacent the burner element of burner 400.

Figure 24:
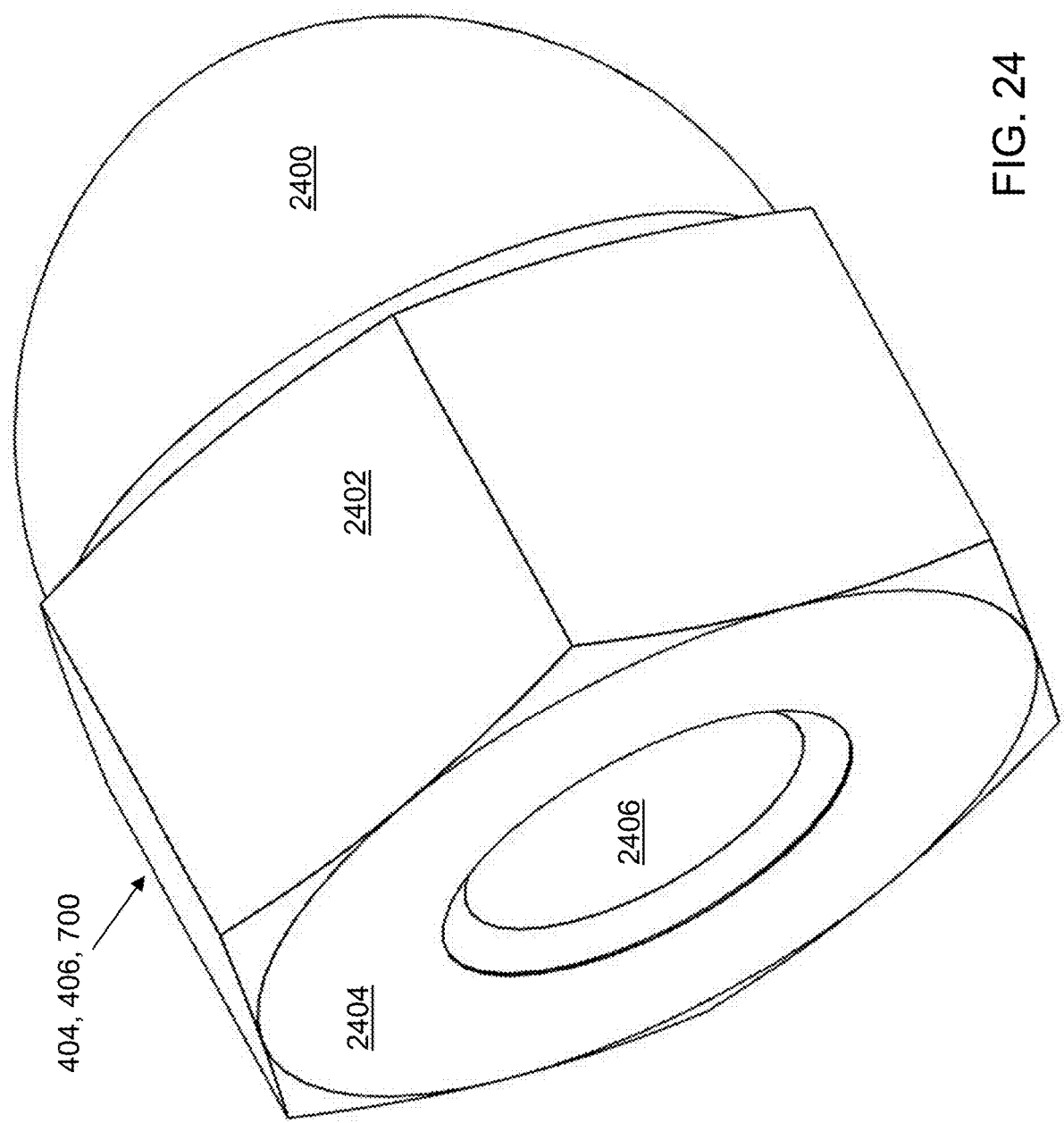
FIG. 24 depicts a top, front, left perspective view of a gap nut of the griddle of FIG. 3 in accordance with an illustrative embodiment.

Referring to FIG. 24, a top, front, left perspective view is shown of first gap nut 404, second gap nut 406, and third gap nut 700 in accordance with an illustrative embodiment. In the illustrative embodiment, first gap nut 404, second gap nut 406, and third gap nut 700 have the same shape and size. Each gap nut may include nut head 2400, a nut sidewall 2402, a nut bottom surface 2404, and a stud aperture wall 2406. Nut head 2400 has a half dome shape. Nut sidewall 2402 extends from a circumferential edge of nut head 2400. Nut sidewall 2402 has a hexagon shape with a perimeter that is larger than a circumference of the circumferential edge of nut head 2400. The perimeter of nut sidewall 2402 is sized so that it does not fit within any of first gap nut aperture wall 1704, second gap nut aperture wall 1706, and third gap nut aperture wall 1708 of griddle plate bottom surface 1700. For example, griddle plate bottom surface 1700 may rest on a top edge of nut sidewall 2402 between the perimeter of nut sidewall 2402 and the circumferential edge of nut head 2400.

Nut sidewall 2402 defines a minimum height of an air gap that allows venting around the entire perimeter of griddle plate bottom surface 1700 when griddle plate bottom surface 1700 is mounted on first gap nut 404, second gap nut 406, and third gap nut 700. The air gap is defined around the perimeter of griddle plate 500 between pan flange 2000 and griddle plate bottom surface 1700. A height of the air gap further may be adjusted based on how nut head 2400 fits within first gap nut aperture wall 1704, second gap nut aperture wall 1706, and third gap nut aperture wall 1708 of griddle plate bottom surface 1700.

Nut bottom surface 2404 extends across a bottom of nut sidewall 2402 opposite the circumferential edge of nut head 2400. Stud aperture wall 2406 defines a hole formed in nut bottom surface 2404 and is sized to accept one of first stud 1916, second stud 1918, or third stud 1920. Stud aperture wall 2406 may further be threaded (not shown). For simplicity of description, nut head 2400 and nut sidewall 2402 are used to describe a general shape of first gap nut 404, second gap nut 406, and third gap nut 700 though they may not be distinct elements, but instead may form a single structure formed, for example, using a molding process.

Figure 25:
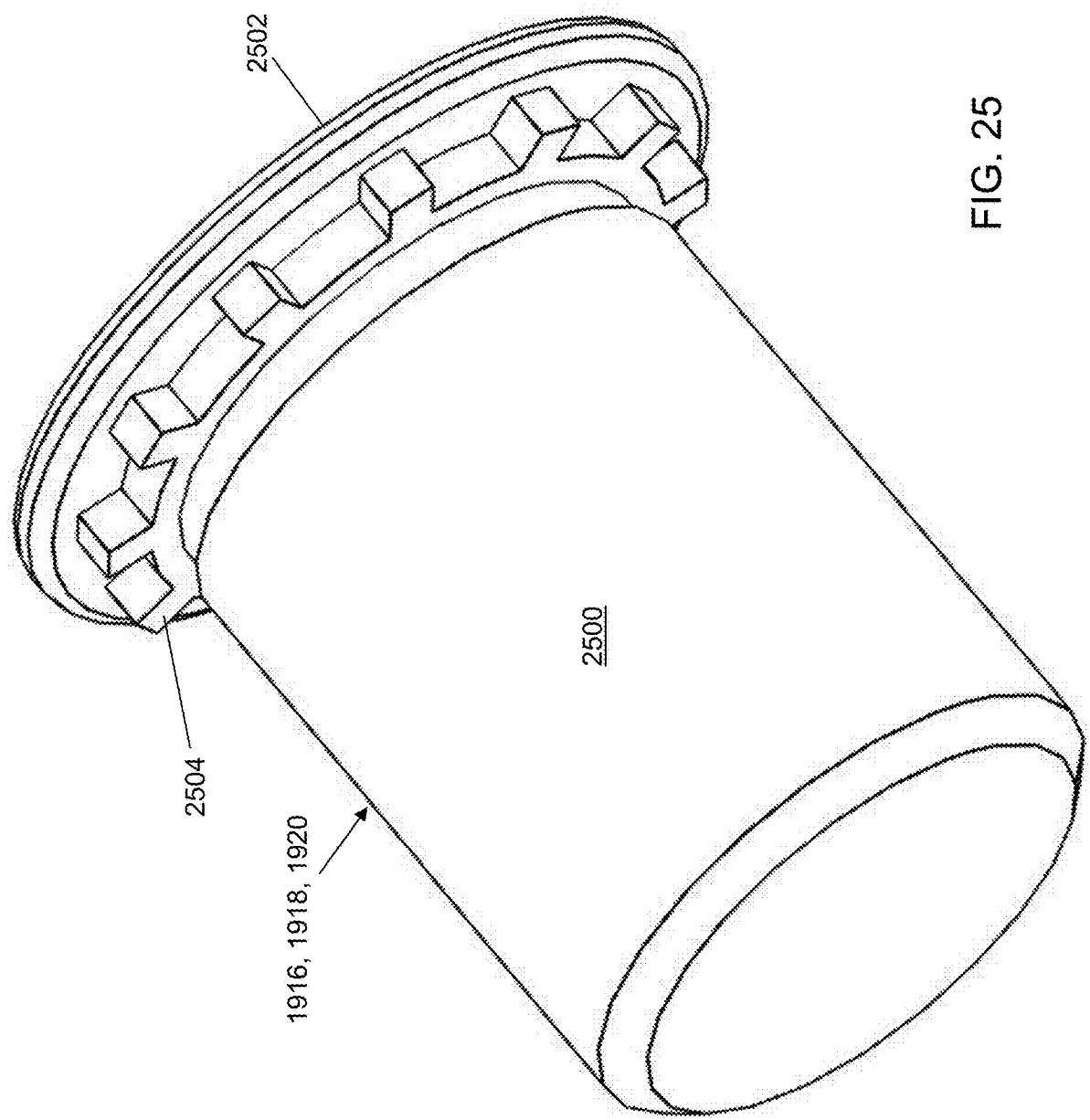
FIG. 25 depicts a top, front, left perspective view of a stud of the griddle of FIG. 3 in accordance with an illustrative embodiment.

Referring to FIG. 25, a top, front, left perspective view is shown of first stud 1916, second stud 1918, and third stud 1920 in accordance with an illustrative embodiment. In the illustrative embodiment, first stud 1916, second stud 1918, and third stud 1920 have the same shape and size. Each stud may include a stud head 2500, a stud base 2502, and a stud gear layer 2504. Stud gear layer 2504 is mounted between stud head 2500 and stud base 2502. Stud head 2500 is sized and shaped to fit within stud aperture wall 2406. Stud head 2500 may further be threaded (not shown) so that a length that stud head 2500 is inserted within stud aperture wall 2406 can be adjusted. Stud base 2502 is mounted to top flange 1900 of inner frame 704 such that stud head 2500 extends upward from top flange 1900 of inner frame 704. Stud gear layer 2504 includes keys so first gap nut 404, second gap nut 406, and third gap nut 700 can be rotated without rotating first stud 1916, second stud 1918, and third stud 1920, respectively, to adjust the height of the air gap and to level griddle plate 500.

The height of the air gap may be adjusted based on how stud head 2500 fits within stud aperture wall 2406. Additionally, height of the air gap further may be adjusted based on the length that stud head 2500 is inserted within stud aperture wall 2406. For example, first gap nut 404, second gap nut 406, and third gap nut 700 are independently screwed onto first stud 1916, second stud 1918, and third stud 1920, respectively, to adjust the height of the air gap and to level griddle plate 500. First stud 1916, second stud 1918, and third stud 1920 may be positioned at other locations on top flange 1900 of inner frame 704.

For simplicity of description, stud head 2500, stud base 2502, and stud gear layer 2504 are used to describe a general shape of first stud 1916, second stud 1918, and third stud 1920 though they may not be distinct elements, but instead may form a single structure formed, for example, using a molding process.

In the illustrative embodiment, outer frame 308, burner 400, burner plate 1000, inner frame 704, reflector pan 402, griddle plate 500, and cover 302 have rectangular shapes when viewed from above. In alternative embodiments, outer frame 308, burner 400, burner plate 1000, inner frame 704, reflector pan 402, griddle plate 500, and cover 302 may form other shapes when viewed from above. In alternative embodiments, griddle 300 need not include each of outer frame 308, inner frame 704, and reflector pan 402. For example, a single frame may include aspects of outer frame 308, inner frame 704, and reflector pan 402 such that griddle plate bottom surface 1700 may rest on a top edge of nut sidewall 2402 that is mounted to stud head 2500 that is in turn mounted to a flange of the single frame. A plurality of sidewalls of the single frame may extend between a bottom wall to which burner 400 is mounted and the flange. Various combinations of outer frame 308, inner frame 704, and reflector pan 402 may be used in other alternative embodiments.

Illustrative fasteners include screws that include a shaft and a head as understood by a person of skill in the art. A portion of the shafts may be threaded. Other types of fasteners and mounting methods than those shown for illustration may be used to mount the components of griddle 300 to each other. Other illustrative fasteners may be a rivet, a bolt, a nail, etc. In alternative embodiments, other methods of fastening may be used such as an adhesive such as glue or tape or soldering. A greater or a fewer number of fasteners may be used to mount various elements together in alternative embodiments instead of those shown for illustration. Additionally, different types of fasteners or combinations of fasteners may be used in alternative embodiments instead of those shown for illustration. For example, glue, sealing tape, tight fitting joints, foam, rubber, threads, or other materials or methods may be used.

The one or more components of griddle 300 may be formed of one or more materials, such as various metals that have a sufficient strength and rigidity as well as thermal and permeability properties sufficient to support the described application to cook food.

As used herein, the term "mount" includes join, unite, connect, couple, associate, insert, hang, hold, affix, attach, fasten, bind, paste, secure, hinge, bolt, screw, rivet, solder, weld, glue, form over, form in, layer, mold, rest on, rest against, abut, and other like terms. The phrases "mounted on", "mounted to", and equivalent phrases indicate any interior or exterior portion of the element referenced. These phrases also encompass direct mounting (in which the referenced elements are in direct contact) and indirect mounting (in which the referenced elements are not in direct contact, but are connected through an intermediate element) unless specified otherwise. Elements referenced as mounted to each other herein may further be integrally formed together, for example, using a molding or thermoforming process as understood by a person of skill in the art. As a result, elements described herein as being mounted to each other need not be discrete structural elements unless specified otherwise. The elements may be mounted permanently, removably, or releasably unless specified otherwise.

Use of directional terms, such as top, bottom, right, left, front, back, upper, lower, horizontal, vertical, behind, etc. are merely intended to facilitate reference to the various surfaces of the described structures relative to the orientations introduced in the drawings and are not intended to be limiting in any manner unless otherwise indicated.

The word "illustrative" is used herein to mean serving as an example, instance, or illustration. Any aspect or design described herein as "illustrative" is not necessarily to be construed as illustrative or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A griddle comprising:
    a griddle plate;
    a heating element configured to provide heat to the griddle plate when the griddle is used;
    a frame comprising
        a plurality of walls;
        a flange that extends from top edges of the plurality of walls;
        a plurality of studs mounted to extend upward from the flange; and
        a bottom wall that extends from bottom edges of the plurality of walls toward an interior of the plurality of walls, wherein the heating element is mounted to the bottom wall; and
    a plurality of nuts, wherein a nut of the plurality of nuts is mounted on each stud of the plurality of studs, wherein a bottom surface of the griddle plate is mounted to abut each nut of the plurality of nuts to define an air gap around a perimeter of the griddle plate between the flange and the bottom surface of the griddle plate.

2. The griddle of claim 1, wherein the heating element is mounted to the bottom wall within an aperture formed by the bottom wall.

3. The griddle of claim 1, further comprising:
    a reflector pan comprising
        a second plurality of walls; and
        a second flange that extends from top edges of the second plurality of walls;
    wherein the plurality of studs fit through apertures formed through the second flange to mount the second flange on the flange.

4. The griddle of claim 3, wherein bottom edges of the second plurality of walls fit within an aperture formed in the bottom wall.

5. The griddle of claim 4, wherein the second plurality of walls slope outward from a bottom edge to an upper edge of the second flange.

6. The griddle of claim 4, further comprising a sidewall mounted to at least one edge of the griddle plate to extend upward beyond a top surface of the griddle plate and away from the frame.

7. The griddle of claim 6, further comprising:
    a cover comprising
        a cover top; and
        a cover sidewall that extends downward from at least a portion of the cover top;
    wherein the cover sidewall fits within the sidewall and rests on the top surface of the griddle plate.

8. The griddle of claim 1, wherein the bottom surface of the griddle plate includes apertures configured to accept a portion of each nut of the plurality of nuts.

9. The griddle of claim 1, wherein the bottom surface of the griddle plate includes a depression configured to accept a thermostat at least partially therein.

10. The griddle of claim 1, wherein the heating element is an infrared burner.

11. The griddle of claim 1, wherein each nut of the plurality of nuts comprises:
    a nut head; and
    a nut sidewall that extends downward from the nut head;
    wherein a stud aperture wall is formed in a nut bottom surface within the nut sidewall.

12. The griddle of claim 11, wherein each stud of the plurality of studs comprises:
    a stud base, wherein the stud base is mounted to extend upward from the flange; and
    a stud head that extends upward from the stud base.

13. The griddle of claim 12, wherein the stud aperture wall is mounted on a respective stud head.

14. The griddle of claim 13, wherein the nut sidewall includes internal threads, and wherein the stud head includes external threads complementary to the internal threads of the nut sidewall.

15. A griddle comprising:
   a griddle plate;
   a heating element configured to provide heat to the griddle plate when the griddle is used;
   an inner frame comprising
      a first plurality of walls;
      a flange that extends from top edges of the first plurality of walls; and
      a plurality of studs mounted to extend upward from the flange;
   an outer frame comprising
      a second plurality of walls; and
      a bottom wall that extends from bottom edges of the second plurality of walls toward an interior of the second plurality of walls, wherein the heating element is mounted to the bottom wall; and
   a plurality of nuts, wherein a nut of the plurality of nuts is mounted on each stud of the plurality of studs, wherein a bottom surface of the griddle plate is mounted to abut each nut of the plurality of nuts to define an air gap around a perimeter of the griddle plate between the flange and the bottom surface of the griddle plate.

16. The griddle of claim 15, further comprising:
   a reflector pan comprising
      a third plurality of walls; and
      a second flange that extends from top edges of the third plurality of walls;
   wherein the plurality of studs fit through apertures formed through the second flange to mount the second flange on the flange.

17. The griddle of claim 15, wherein the bottom surface of the griddle plate includes apertures configured to accept a portion of each nut of the plurality of nuts.

18. The griddle of claim 15, wherein each nut of the plurality of nuts comprises:
   a nut head; and
   a nut sidewall that extends downward from the nut head;
   wherein a stud aperture wall is formed in a nut bottom surface within the nut sidewall.

19. The griddle of claim 18, wherein each stud of the plurality of studs comprises:
   a stud base, wherein the stud base is mounted to extend upward from the flange; and
   a stud head that extends upward from the stud base.

20. The griddle of claim 19, wherein the stud aperture wall is mounted on a respective stud head, wherein the nut sidewall includes internal threads, and the stud head includes external threads complementary to the internal threads of the nut sidewall.

* * * * *